(12) United States Patent
Bayer et al.

(10) Patent No.: US 6,267,433 B1
(45) Date of Patent: Jul. 31, 2001

(54) MOTOR VEHICLE ROOF

(75) Inventors: Wolfgang Bayer; Jürgen Stenvers, both of München (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/594,342

(22) Filed: Jun. 15, 2000

(30) Foreign Application Priority Data

Jun. 15, 1999 (DE) ............................................. 199 27 238

(51) Int. Cl.⁷ ...................... B60J 7/02; B60J 7/05; B60J 7/185
(52) U.S. Cl. ...................... 296/121; 296/120.1; 296/122; 296/124
(58) Field of Search ................. 296/120.1, 121, 296/122, 124

(56) References Cited

U.S. PATENT DOCUMENTS

| Re. 34,033 | * | 8/1992 | Godette | 296/107 |
|---|---|---|---|---|
| 3,002,785 | * | 10/1961 | Larche | 296/120 |
| 4,968,089 | * | 11/1990 | Murai et al. | 296/219 |
| 5,033,789 | | 7/1991 | Hayashi et al. . | |
| 5,251,952 | * | 10/1993 | Guckel et al. | 296/107 |
| 5,746,470 | | 5/1998 | Seel et al. . | |
| 5,839,778 | | 11/1998 | Schaible et al. . | |
| 5,938,271 | * | 8/1999 | Schuler et al. | 296/121 |
| 5,944,375 | | 8/1999 | Schenk et al. . | |
| 5,947,546 | * | 9/1999 | Hilliard et al. | 296/107.11 |
| 5,992,917 | * | 11/1999 | Hilliard et al. | 296/103 |

FOREIGN PATENT DOCUMENTS

| 40 10 276 | 10/1990 | (DE) . |
|---|---|---|
| 43 24 708 | 1/1995 | (DE) . |
| 44 45 580 | 12/1995 | (DE) . |
| 195 07 431 | 8/1996 | (DE) . |
| 196 34 511 | 1/1998 | (DE) . |

* cited by examiner

Primary Examiner—D. Glenn Dayoan
Assistant Examiner—Greg Blankenship
(74) Attorney, Agent, or Firm—Nixon Peabody LLP; David S. Safran

(57) ABSTRACT

A motor vehicle roof with a lowerable roof part (12) which can be moved via a lowering mechanism (48) from a raised into a lowered position and which has a closing device (14), with which the lowerable roof part (12) can be locked both in the raised and also in the lowered position, the closing device (14) with the lowerable roof part (12) raised interacting with a first pivot support (11) which is fixed on a stationary roof part (20). The lowerable roof part (12) can be locked securely in the raised and in the lowered position without high construction cost, and which enables universal use is created by the closing device (14) with the lowerable roof part (12) lowered interacting with a second pivot support (62) which is fixed on an element of the lowering mechanism (48).

16 Claims, 14 Drawing Sheets

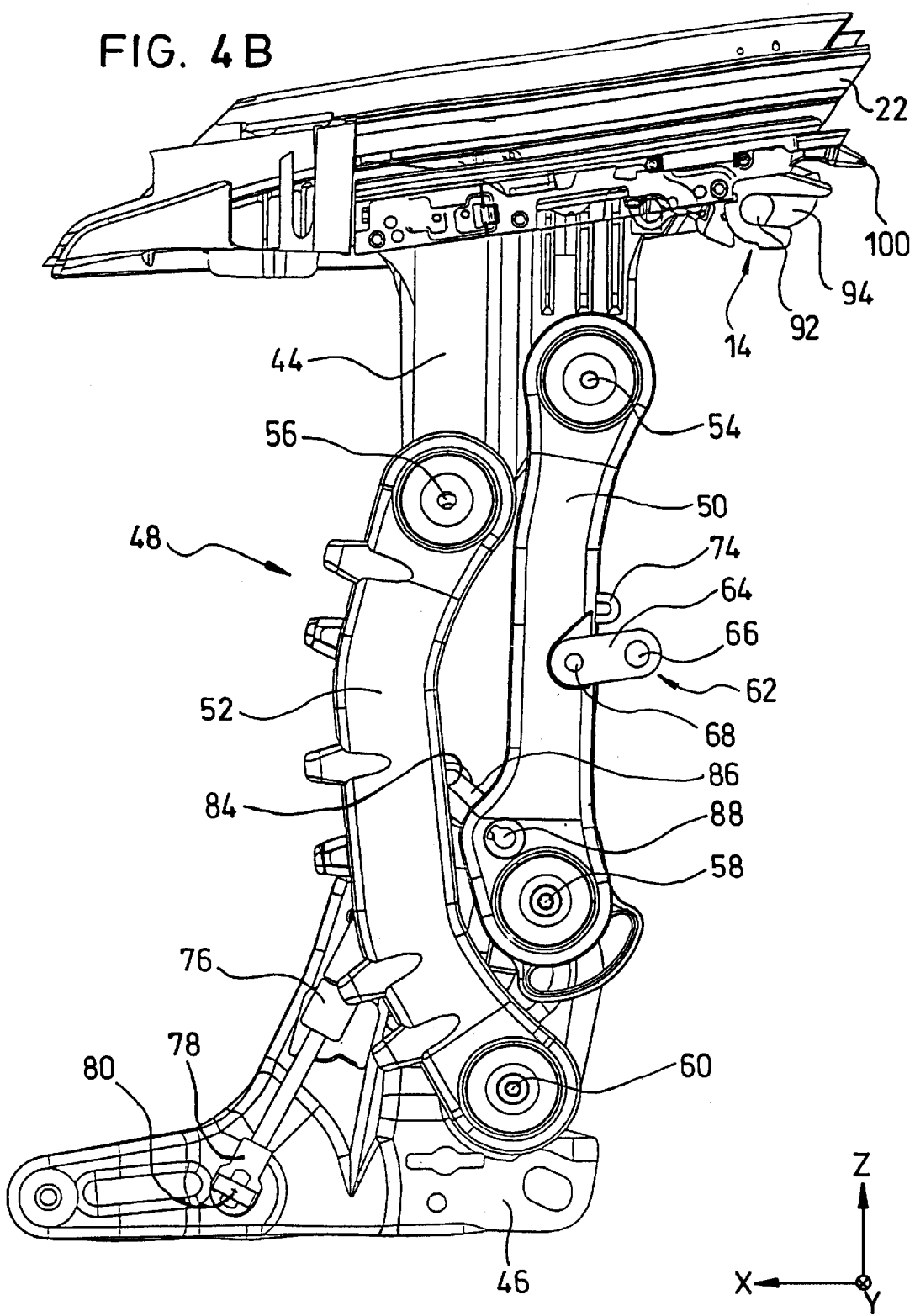

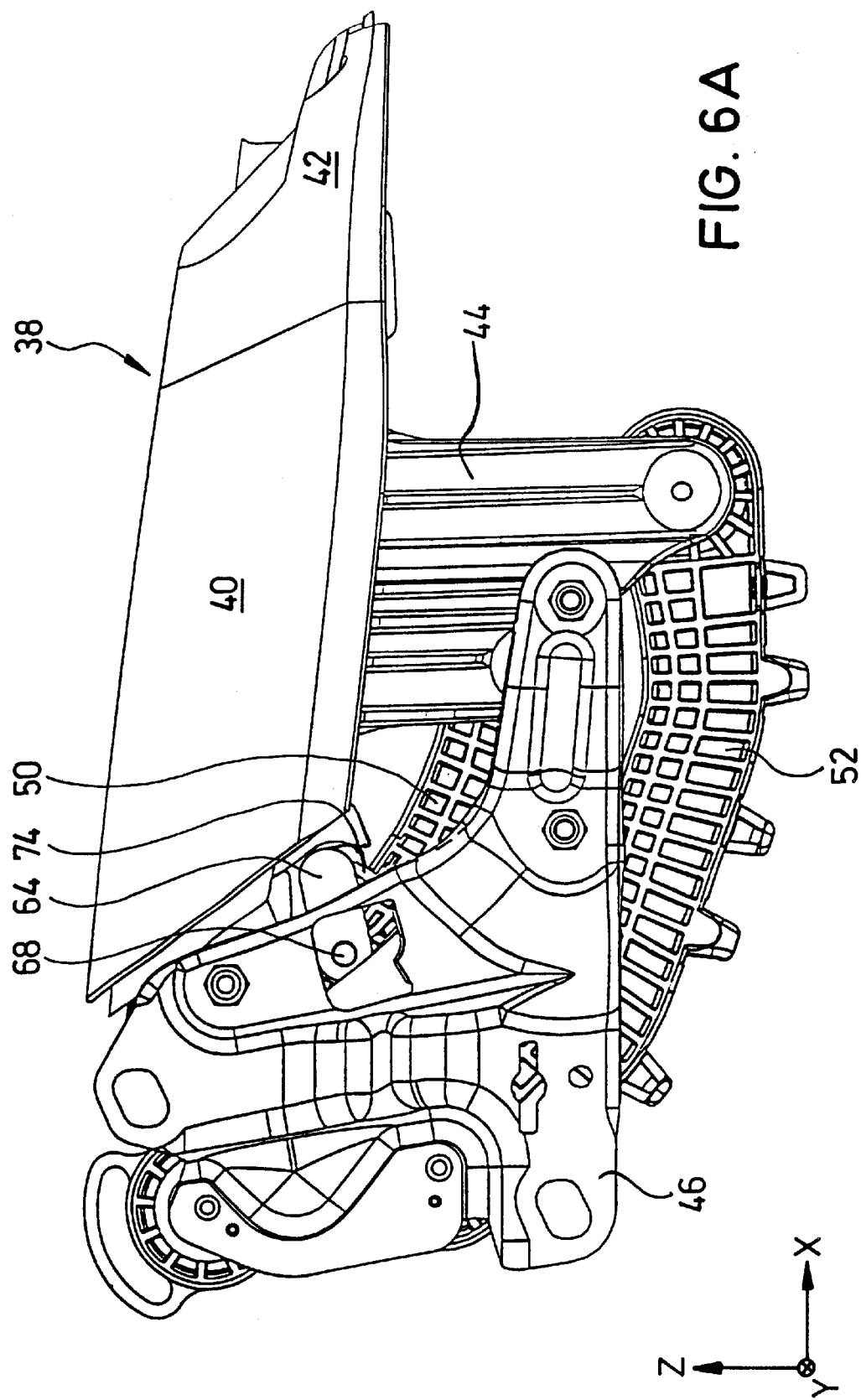

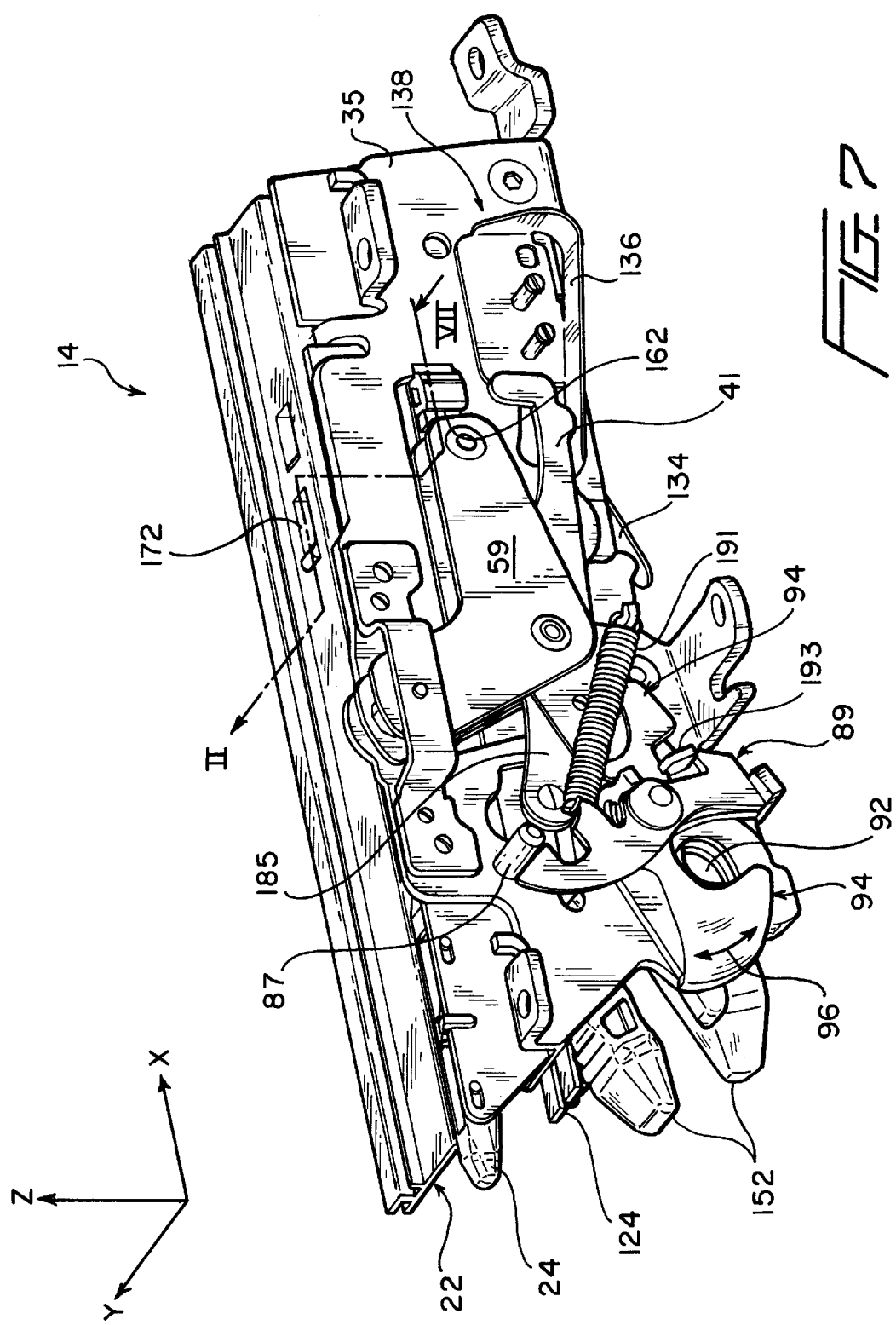

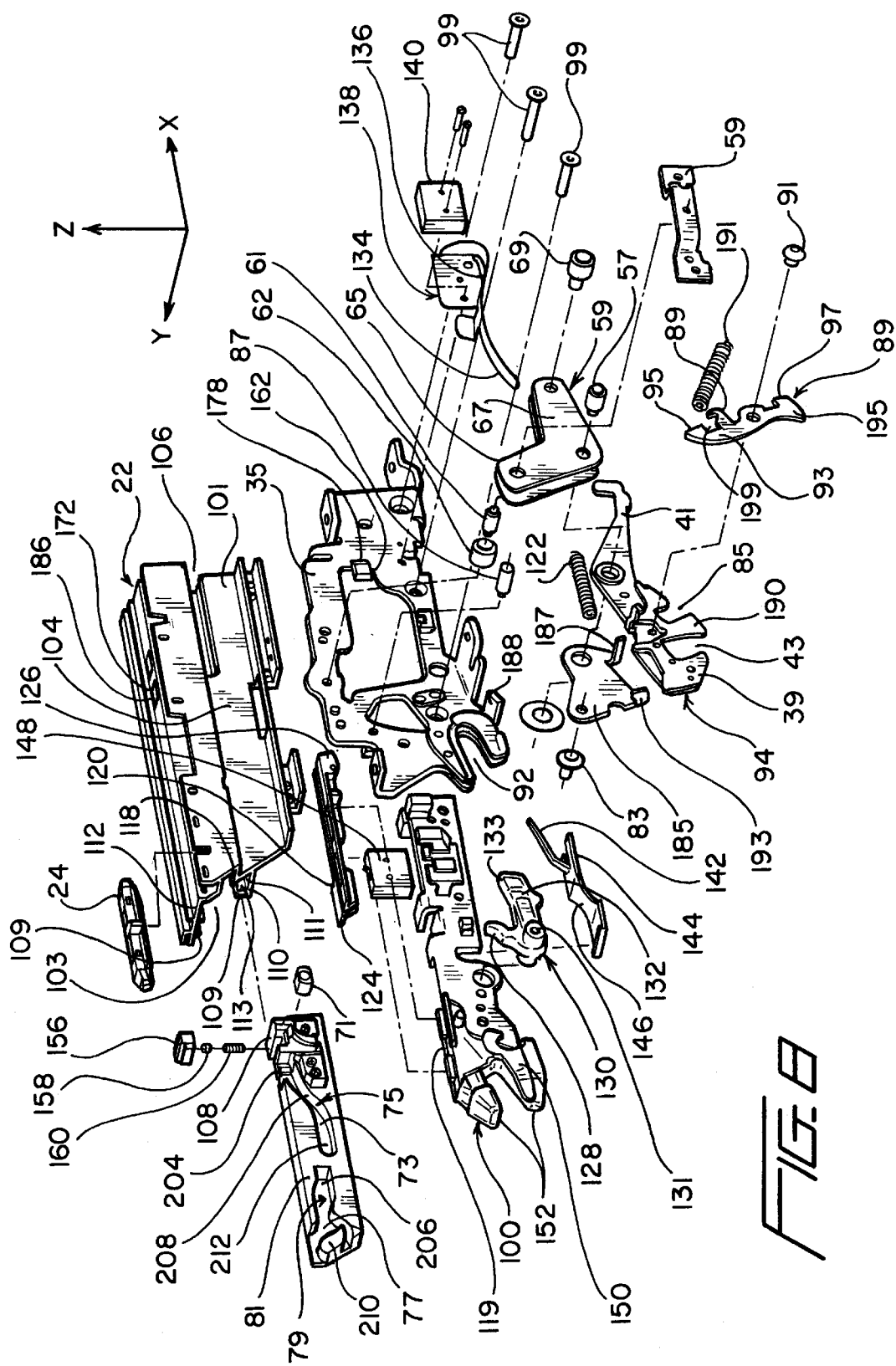

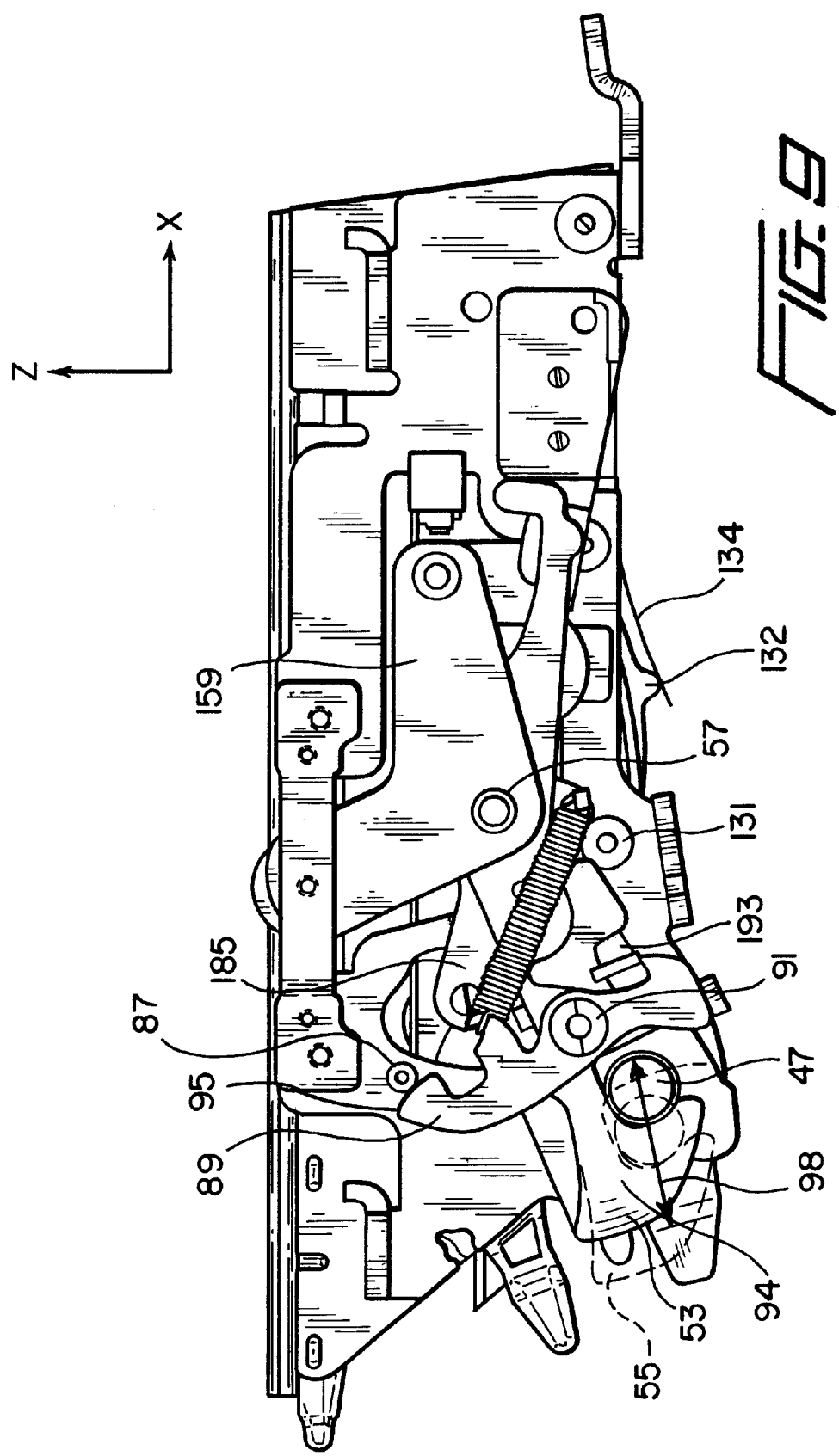

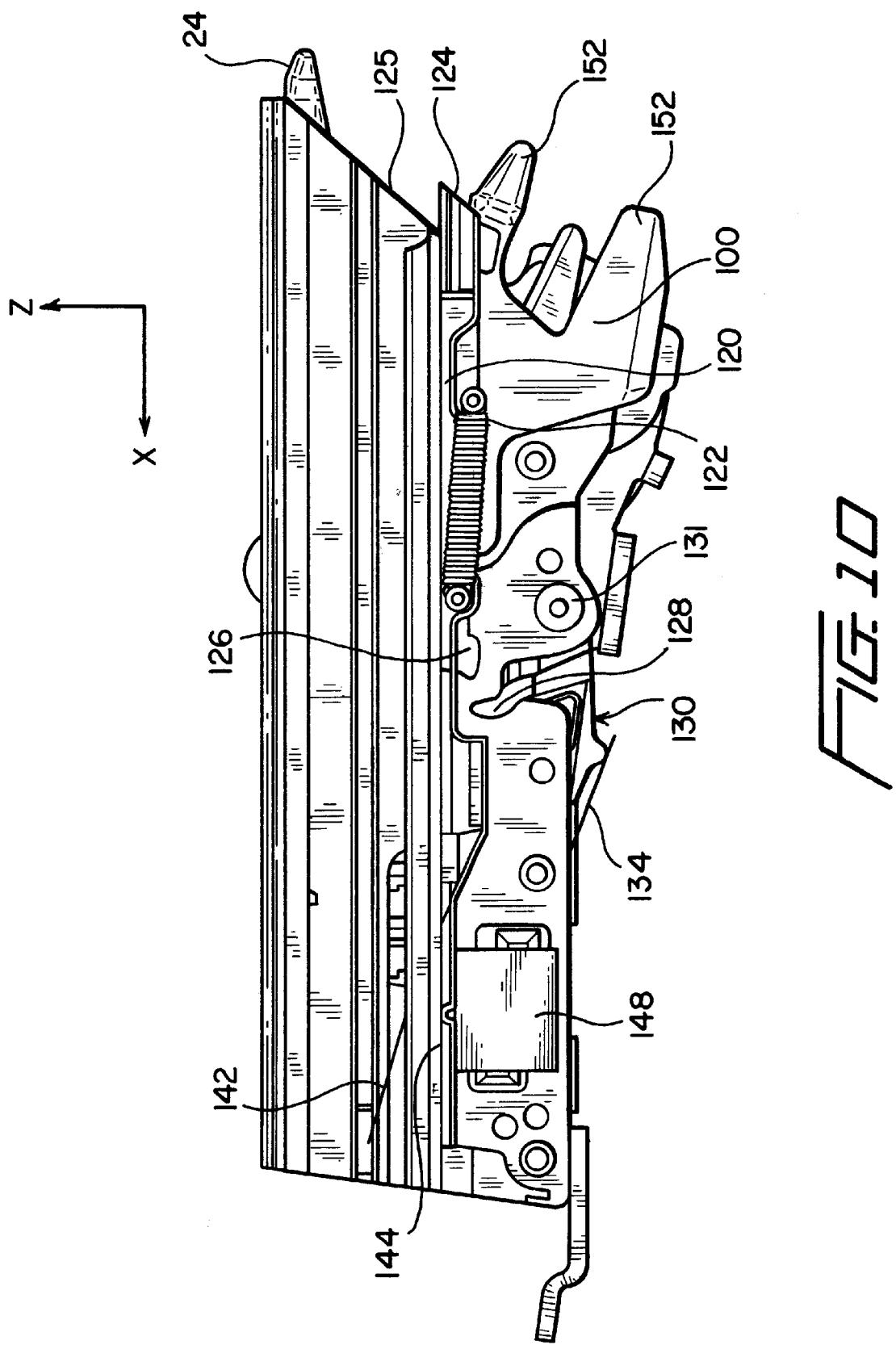

MOTOR VEHICLE ROOF

BACKGROUND OF THE INVENTION

1. Field of the Invention

The invention relates to a motor vehicle roof with a lowerable roof part which can be moved via a lowering mechanism from a raised into a lowered position and which comprises a closing device by means of which the lowerable roof part can be locked both in the raised and also in the lowered position, the closing device, with the lowerable roof part raised, interacting with a first pivot support which is fixed, at least temporarily, on an at least partially a stationary roof part.

2. Description of Related Art

There are manifold possibilities for stably locking a lowerable roof part, especially a lowerable roof part of a convertible, in the raised and lowered position. Thus, for example, German Patent DE 40 10 276 C2 and its corresponding U.S. Pat. No. 5,033,789 disclose a foldable roof structure which comprises a roof plate and a rear window plate which is hinged to the roof plate, a lower edge area of the roof structure pivotably connected with a rear part of the body. The roof plate and the rear window plate can both be stowed by folding them together underneath a protective hood which is provided on the rear part of the motor vehicle, and in the folded-out state, are supported and can be locked to the side members and cross members of the passenger compartment, for which purpose there are several separate locking mechanisms. The roof plate is provided on opposite sides in the front area with a roof plate locking mechanism, and in the middle area in front of the top edge of the rear window plate there is a rear window locking mechanism, these two locking mechanisms being actuated by hand. Finally, a motorized protective hood locking mechanism is located on the rear part structure in order to securely fix the side edges of the protective hood on the rear part structure. The two initially mentioned locking mechanisms are used to prevent fluttering of the plates when they are in the folded-out position, conversely the locking mechanism of the protective hood is designed to suppress fluttering of the protective hood both in the folded-out position and also in the folded-in, stowed position of the plates.

German Patent DE 43 24 708 C2 discloses a lowerable roof for motor vehicles with a roof shell which has a roof plate and a rear roof post and which can be moved with the roof post into an accommodation space between the side walls of the body behind the passenger seat and forward of the rear wheels, according to which it is held aligned in a transverse plane of the motor vehicle. The rear window can be moved from the position of use to a position of non-use in which its glass surface is spaced from the roof plate by a short distance. There are guide means for motion control of the roof shell and the rear window, and the roof shell can be lowered via two sliding guides which are located in the accommodation space and the sliding guides are arranged independently of the guide means of the rear window. In each of the two corner areas of the face sides of the roof posts, there is a sliding pin which fits into the respective sliding guide. The two sliding guides extend with a curvature which causes the roof to move forward in the direction of travel, proceeding from the top edge of the side wall downward, the horizontal distance between the sliding guides having a narrowed site at roughly half the height of the side wall. By increasing the distance of the sliding guides underneath the narrowed site in the bottom end position of the lowered roof, the desired rest position is induced and can be stably maintained. Furthermore, to lock the roof shell in a position which covers the passenger compartment, there are front closures.

The hardtop motor vehicle known form German Patent DE 44 45 580 C1 and its corresponding U.S. Pat. No. 5,746,470 is provided with a roof structure which has a roof part and a rear window part which is pivotably connected to it, which can be lowered by a forced control means, so as to pivot around a rear axle mounted on the motor vehicle which is supported in the rear area of the motor vehicle body, into a concealed box, e.g., the vehicle trunk. The forced control means has a control element which is made as linkage which engages a guide part in the area of the pivot axis of the roof with a guide rod and a main guide rod, and which with a pivoting connecting rod which is connected to a drive element forms an articulated parallelogram which moves the roof part and the rear window part. If the roof structure is in its open position which is lowered into the trunk, the control element which is formed by the linkage can be moved into a stable end position which forms a support in the manner of a toggle lever. The roof structure which is placed in the trunk of the motor vehicle is afterwards sealed in its rest position with the rear hatch/trunk lid. In its closed position, which covers the passenger compartment, the roof part is fixed via connecting elements on the windshield frame.

In the movable roof structure disclosed in German Patent DE 196 34 511 C1 and its corresponding U.S. Pat. No. 5,944,375, has a front, dimensionally stable and likewise rear roof part for an open passenger car, there is a double-sided parallelogram rod by which the front roof part can be moved between its closed and its open position. Between the two parallelogram connecting rods, on each side of the parallelogram rod, there is a locking mechanism which rigidly couples the respective rear parallelogram connecting rods to the adjacent forward parallelogram connecting rod and prevents relative movement between the parallelogram connecting rods and thus also between the front and the rear roof shell in the closed position of the roof part.

A generic motor vehicle roof with a front roof part and a rear window part is known from DE 195 07 431 C1 and its corresponding U.S. Pat. No. 5,839,778 which can be supported in the closed position which covers the rear on the windshield frame via connecting elements which are located on the front roof part and after pivoting back towards the rear area of the motor vehicle in an open position can be placed in a rear-side concealed box (trunk). The connecting elements which are provided on the front roof part interact in pairs with locking parts which are attached on the body-side in the rear area of the motor vehicle with the roof structure resting in the rear-side trunk, and thus, fix the folded-together roof structure. The locking parts which interact with the connecting elements attached to the front roof part with essentially the same action both in the area of the windshield frame and also in the rear area are components. A drive element which is formed by a hydraulic cylinder enables automatic fixing of the roof structure both in the closed position and in the stowed position.

SUMMARY OF THE INVENTION

In view of the foregoing, a primary object of the invention is to devise a motor vehicle roof of the initially mentioned type in which the lowerable roof part can be locked securely in the raised and in the lowered position without high construction cost and which enables universal use.

This object is achieved in a motor vehicle roof with a lowerable roof part which can be moved via a lowering mechanism from a raised into a lowered position and which comprises a closing device by means of which the lowerable roof part can be locked both in the raised and also in the lowered position, the closing device interacting with a first pivot support which is fixed at least temporarily on an at least partially stationary roof part with the lowerable roof part raised by the closing device interacting with a second pivot support which is fixed on an element of the lowering mechanism with the lowerable roof part lowered.

The lowerable roof part is held in the lowered position without recourse to body-side elements in a space-saving stowed position. The number of interfaces between the lowerable roof part and the motor vehicle body is reduced and there is greater freedom in the placement and configuration of the closing device. In addition, it is possible without great cost to detachably connect the lowerable roof part to the body if necessary, also via a coupling device which can be actuated by the operator since, even with the roof part removed, retention in the compact stowed position is ensured.

The at least partially stationary roof part can be a permanently stationary roof part, as for example, a forward cross beam which runs above the windshield (windshield frame) around lateral rear columns (B or C columns) or a rear cross beam which runs between the lateral rear columns. In addition, the at least partially stationary roof part itself can also be made movable, for example, lowerable, as is the case, for example, in lowerable, side rear columns. The lowerable roof part can essentially comprise the entire roof surface structure as far as the windshield frame or simply one rear roof part, and in both cases, the lowerable roof part can, furthermore, have a rear part with a rear window and also side parts.

Thus, the ease of operation and reliability of operation can be increased when the closing device can be actuated by an auxiliary force actuation device. The auxiliary force actuation device preferably comprises a drive motor or a hydraulic cylinder.

In another embodiment of the invention, there is also a roof part which can be opened while traveling and which is supported by the lowerable roof part at least in its open position. The openable roof part can be a folding roof, a louvered roof, a sliding roof, or sliding and lifting roof with at least one openable cover in a conventional configuration. As a result of the support of the openable roof part at least in its open position in or on the lowerable roof part, the openable roof part can be lowered jointly with the lowerable roof part. To do this, it is especially provided that the openable roof part can be locked, at least in its open position, with reference to the lowerable roof part. Actuation of the openable roof part can be produced via an auxiliary force actuation device which can conventionally comprise a drive motor with compressively stiff cables for transmitting the actuation force to the openable roof part.

In particular, the auxiliary force actuation device actuates both the closing device and also the opening and closing motion of the openable roof part.

The lowering mechanism can be made as a four-bar arrangement which especially comprises a first and a second connecting rod, the connecting rods each being pivotalby connected to the lowerable roof part and to a main bearing which is fixed on the motor vehicle body. Here, the second pivot support is preferably fixed on the first connecting rod of the four-bar arrangement and is advantageously located roughly in the middle between the two pivot axes of the first connecting rod.

If the second pivot support is movably connected to the first connecting rod of the four-bar arrangement, the second pivot support with reference to the closing device can execute relative motion when the lowerable roof part is locked in its lowered position. In doing so the second pivot support is connected preferably with a swivelling capacity to the first connecting rod of the four-bar arrangement, the pivot axis of the second pivot support running essentially parallel to the pivot axes around which the first connecting rod of the four-bar arrangement can be pivoted with reference to the lowerable roof part and the main bearing.

Advantageously, the second pivot support can be moved into a rest position by means of a prestressed spring arrangement which is supported on the first connecting rod of the four-bar arrangement, which position the second pivot support assumes at least if is does not interact with the closing device. Especially in interacting with the closing device, can the second pivot support be moved from its rest position into a deflected position against the action of the prestressed spring arrangement.

In the deflected state, the second pivot support can adjoin a rubber-elastic stop which is provided between the second pivot support and the first connecting rod of the four-bar arrangement. In this way, not only is the stop damped, but the return of the second pivot support into its rest position after release of the locking between the first pivot support and the closing device is supported.

To support the lifting of the lowerable roof part into its raised position, a spring arrangement can be coupled to the first and/or on the second connecting rod of the four-bar arrangement. The spring is supported on the motor vehicle body, and a spring force is applied to the lowerable roof part in the direction toward the raised position to compensate at least for part of the weight the component of the lowerable roof part acts in the lowering direction. The spring arrangement can comprise a gas pressure spring, if necessary in combination with a damper.

In particular, with manual actuation of the lifting and lowering motion of the lowerable roof part, the spring arrangement is preferably made such that the spring force acts on the lowerable roof part essentially only between the lowered position and an intermediate position which precedes reaching the raised position. After unlocking the lowerable roof part from the at least temporarily stationary roof part, the lowerable roof part can follow an essentially unpowered idle path from its raised position to the intermediate position, from which it is then manually brought into its lowered position. Conversely, proceeding from the lowered position, after releasing the lock, the raising of the lowerable roof part is supported until the intermediate position is reached. Here, the amount of spring force is advantageously chosen such that the lowerable roof part is stably held by the spring arrangement in the intermediate position.

To accomplish an idle path essentially without transfer of force between the spring arrangement and the first or second connecting rod in the area between the raised position and the intermediate position of the lowerable roof part, the spring arrangement can be coupled via a rocker which is pivotably connected to the first or second connecting rod of the four-bar arrangement and which decouples the motion of the lowerable roof part from the actuation of the spring arrangement between the raised position and the intermediate position of the lowerable roof part; starting with reaching the intermediate position, the pivoting of the rocker is blocked with reference to the connecting rod. In particular, it is provided that the rocker be connected to the first connecting rod of the four-bar arrangement at a point which is near the pivot axis around which the first connecting rod can be pivoted with reference to the main bearing.

The spring arrangement is supported on the body side, preferably, on the main bearing so that indirect support of the spring arrangement takes place with reference to the motor vehicle body.

In the following one advantageous embodiment of the invention is explained in detail using the accompanying drawings.

BRIEF DESCRIPTION OF THE DRAWINGS

FIG. 4B shows a side view in the direction of arrow B of FIG. 3 of the components reproduced in FIG. 4A, the roof cassette being shown in cross section;

FIG. 6A is a side view similar to that of FIG. 4A, but with the roof cassette in the lowered position;

FIG. 7 is a perspective view of the closing device, a locking hook of the closing device being located in its rear catch position in the locking position;

FIG. 8 is an exploded view of the closing device of FIG. 3;

FIG. 9 is a side view in the direction toward the bearing plate of the closing device of FIG. 7;

FIG. 10 is a side view in the direction toward the guide rail of the closing device of FIG. 7;

DETAILED DESCRIPTION OF THE INVENTION

Figure 1:
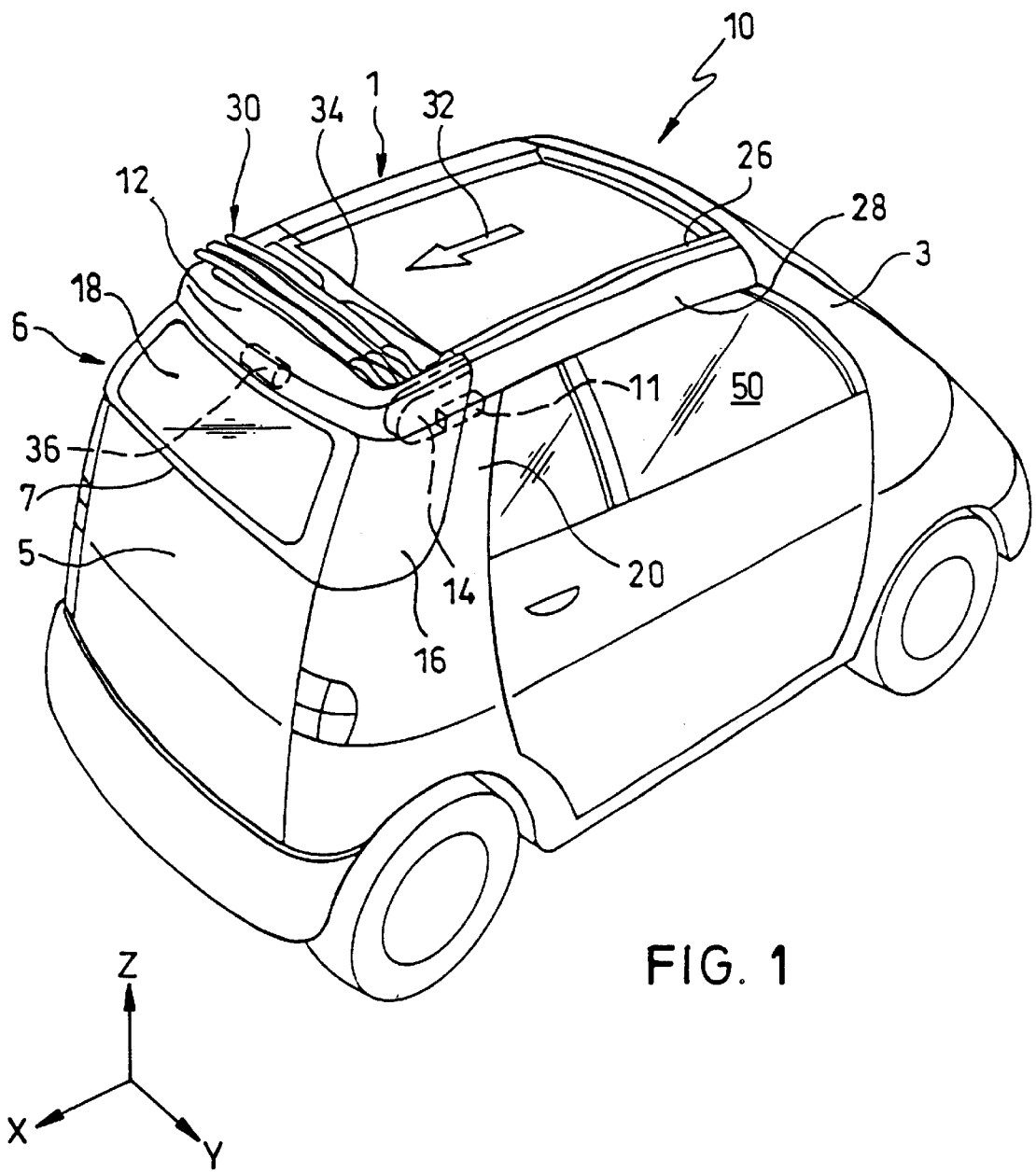
FIG. 1 is a perspective view of a motor vehicle with a lowerable roof part which is made as a roof cassette, in the raised position, and a folding roof as the openable roof part, locked in the raised position.
Figure 2:
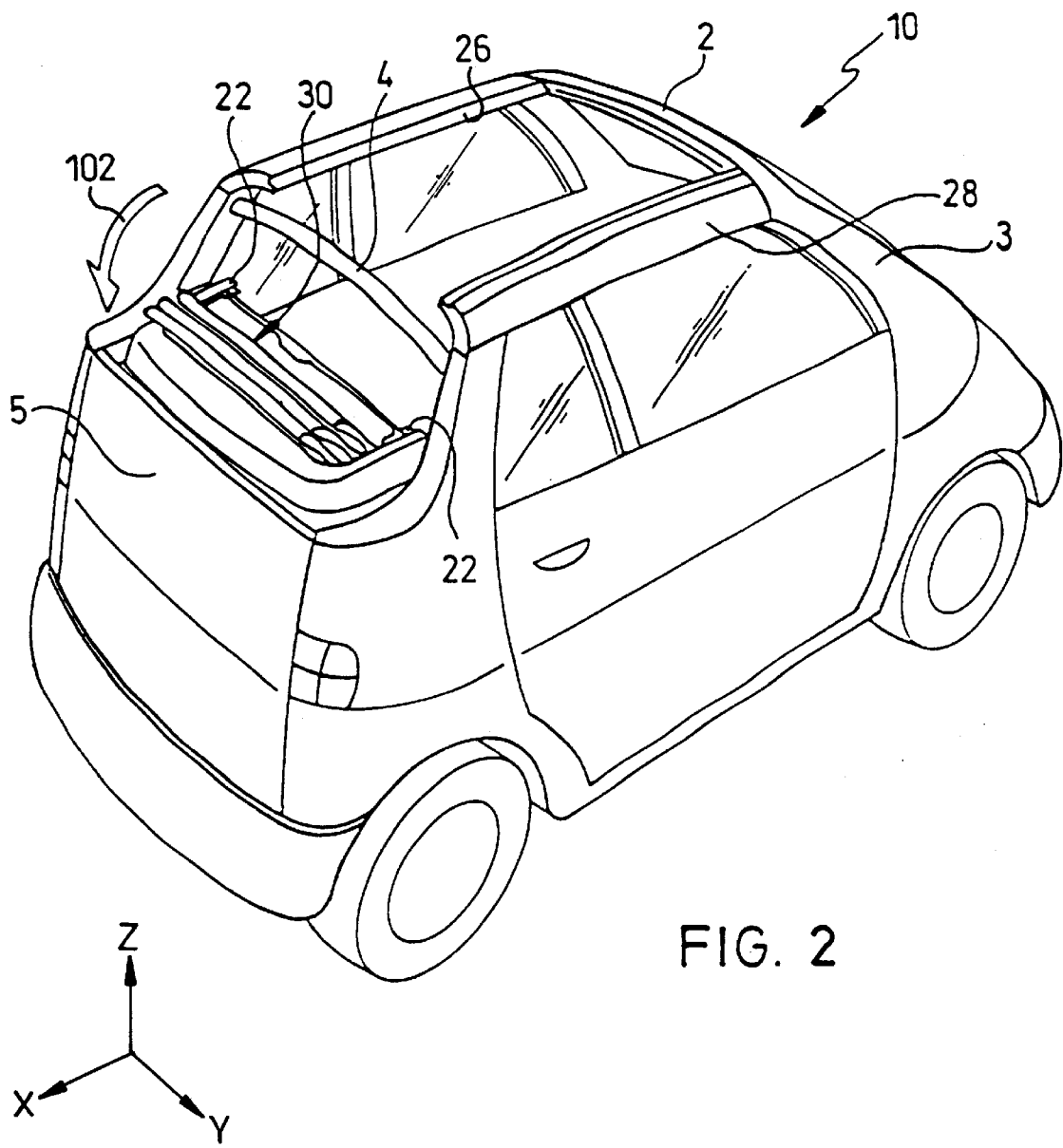
FIG. 2 is a perspective view of the motor vehicle from FIG. 1, the roof cassette supporting the folding roof which is located in the open position and together with it has been moved into and locked in the lowered position.
Figure 3:
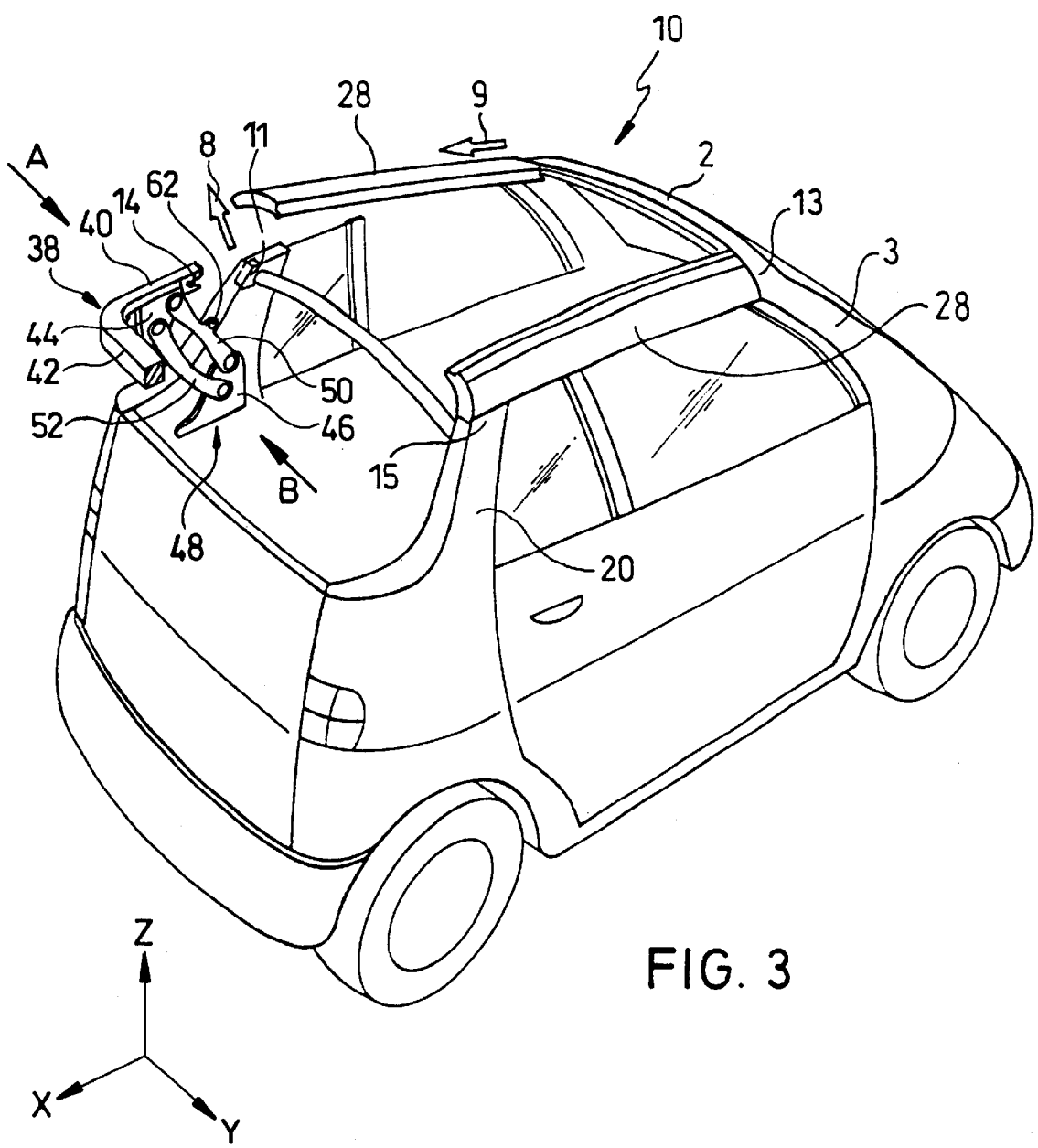
FIG. 3 is a perspective view of the motor vehicle from FIG. 1, in which for reasons of clarity, only one part of the frame of the roof cassette is shown, a lowering mechanism which controls the lifting and lowering motion of the roof cassette and dismounting of side members which extend between the rear side columns and the front cross beam which runs above the windshield being shown schematically.

FIGS. 1 to 3 show a motor vehicle 10 with a motor vehicle roof 1, the motor vehicle roof 1 comprising a folding roof 30 which can be actuated by a drive motor 36 as an openable roof part, a lowerable roof part which is made as a roof cassette 12, a rear part 6 and side members 28, the side members 28 extending between the rear side columns of the motor vehicle 10 (B-columns 20) and a front cross beam 2 which runs above the windshield. The folding roof 30 is movably supported in each of two guide rail sections on both the left and the right side viewed in the direction of travel, of which a rear guide rail section 22 is arranged in the roof cassette 12 and a front guide rail section 26 is arranged in the side member 28. By means of the drive motor 36, the folding roof 30 can be moved in its opening direction 32 or opposite thereto in a closing direction via compressively stiff cables (not shown) and can be moved into any intermediate positions between its open position (compare FIGS. 1 and 2) and its closed position. In the open position, the folding roof 30 is supported in the roof cassette 12, and all parts of the folding roof 30 which can be moved in guide rail sections 22 and 26 are held in the rear guide rail section 22 in the roof cassette 12, and they can be locked with reference to the roof cassette 12. In doing so, the folding roof 30 is pushed to the rear so far in the opening direction 32 that the front edge 34 of the roof lies essentially flush with the front edge of the roof cassette 12 in the open position.

The side members 28 are detachably joined to the motor vehicle 10, for which purpose there are front side member bearings 13 in the area of the joint between side members 28 the front cross beam 2 which runs above the windshield and front side columns (A-columns 3) and there are rear side member bearings 15 in the area of the top end of the rear side columns (B-columns 20). To dismount the side members 28, as shown in FIG. 3, first the rear side member bearings 15 are unlocked, the side members 28 are raised on their back end in the direction of the arrow 8 and then pulled out from the front side member bearings 13 in the direction of the arrow 9 to the rear. The dismounted side members 28 can be placed in the motor vehicle 10 in corresponding receiving devices, for example, in a rear door 5. A rear cross beam 4 can extend in the manner of a roll bar between the B-columns 20 which are rigidly connected to the motor vehicle body.

The rear guide rail sections 22 which are located in the roof cassette 12 are attached to the closing devices designated 14 as a whole and which, for their part, are fixed on the roof cassette 12. A closing device 14 is attached to both the right and left side of the roof cassette 12 in the direction of travel, symmetrically to an axis of symmetry which runs in the lengthwise direction of the motor vehicle within the roof cassette 12. Each closing device 14 interacts with a first pivot support 11 which is fixed near the top end of each of the B-columns 20 in order to enable locking and unlocking of the roof cassette 12 with reference to the B-columns 20 when the roof cassette 12 is located in the raised position. The roof cassette 12 is motion-controlled via a lowering mechanism which is made as a four-bar arrangement 48 and which is described further below with reference to the motor vehicle body, and after releasing the locking, can be moved into a lowered position between the closing device 14 and the first pivot support 11 which is provided on the B-columns 20. In the lowered position, the top of the roof cassette 12 comes to rest essentially at the height of the equator line of the motor vehicle. To lock the roof cassette 12 in the lowered position, there is a second pivot support on the four-bar arrangement 48 itself which is labeled 62 as a whole and with which the closing device 14 interacts in a manner similar to the first pivot support 11.

The roof cassette 12 comprises a plastic, U-shaped frame 38 with lateral short legs 40 which run essentially in the direction of travel and a rear long leg 42 which is located essentially transversely to the direction of travel. On the frame 38 of the roof cassette 12 the rear part 6 of the motor vehicle roof 1 is fixed and comprises a rear pane 18 of folding plastic material and likewise folding side parts 16. The bottom 7 of the rear part 6 can be placed against the rear door 5 and can be folded up in order to improve access to the stowage space which is located in the motor vehicle rear. The rear door 5, for its part, is pivotally connected at its bottom with the motor vehicle body and can be folded down independently of the position which the bottom 7 of the rear part 6 assumes and also with the roof cassette 12 lowered. To increase the stability of the rear part, and to attach a lock latch for the rear door 5, a cross beam can be provided on the bottom 7 of the rear part 6.

In FIGS. 4A, 4B, 5A, 5B, 6A, and 6B, the four-bar arrangement 48 which is on the left when, viewed in the direction of travel and a left main bearing 46 via which the four-bar arrangement 48 is connected to the motor vehicle body, are shown in detail, the corresponding right-hand components being made in mirror image. The four-bar arrangement 48 comprises a first connecting rod 50 and a second connecting rod 52 which are each connected via a pivot bearing 54 and 56 on a bearing block 44 which is made in one piece with the arm 40 of the roof cassette frame 38. Proceeding from the pivot bearings 54 and 56, the first and the second connecting rods 50 and 52 of the four-bar arrangement 48 extend to the pivot bearings 58 and 60, the first connecting rod 50 being coupled by means of the pivot bearing 58 and the second connecting rod 52 by means of the pivot bearing 60 to the main bearing 46. The main bearing 46, for its part, is fixed on the motor vehicle body in the area of the inside bottom end of the B-column 20 via mechanical connecting elements, as is illustrated in FIG. 3.

Roughly in the middle between the two pivot bearings 54 and 58, the second pivot support 62 is attached with a pivoting capacity by means of a pivot bearing 68 to the first connecting rod 50 which, like the second connecting rod 52, is made as a molded plastic part. The second pivot support 62 comprises a pivot arm 64 and a pin 66 which is located on the end of the pivot arm 64 which faces away from the pivot bearing 68 and interacts in the manner described below with the closing device 14. In its rest position which is shown in FIGS. 4A, 4B, 5A, and 5B, the pivot arm 64 is essentially perpendicular to the first connecting rod 50, the end of the pivot arm 64 which bears the pin 66 projecting beyond the outside contour of the first connecting rod 50, i.e., the contour facing away from the second connecting rod 52. In this rest position, the pivot arm 64 of the second pivot support 62 is elastically prestressed by means of a bending spring 70 so that it adjoins a fixed stop 72 which is made in one piece with the first connecting rod 50. On the side of the pivot arm 64 facing away from the fixed stop 72, a rubber element 74 is fixed on the first connecting rod 50, as a rubber-elastic stop, at a position which is chosen such that the second pivot support 62, if it is pivoted against the action of the bending spring 70 when it interacts with the closing device 14, comes to rest against the rubber element 74.

Figure 4A:
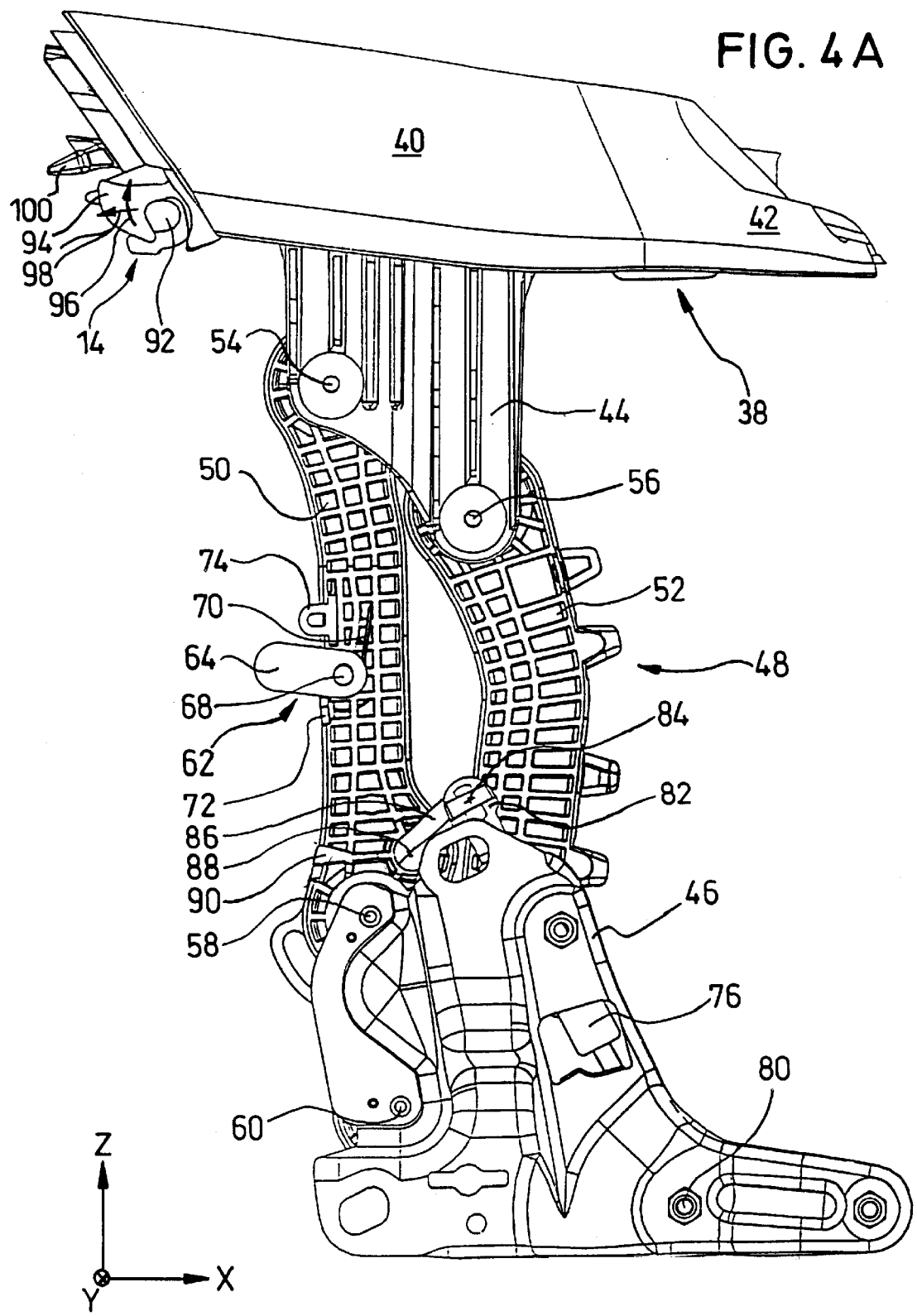
FIG. 4A is a side view in the direction of arrow A of FIG. 3 of the lowering mechanism which is on the left when viewed in the direction of travel together with the roof cassette and a main bearing which is fixed on the body and which supports the lowering mechanism, the roof cassette being located in the raised position and being shown without the folding roof.
Figure 5A:
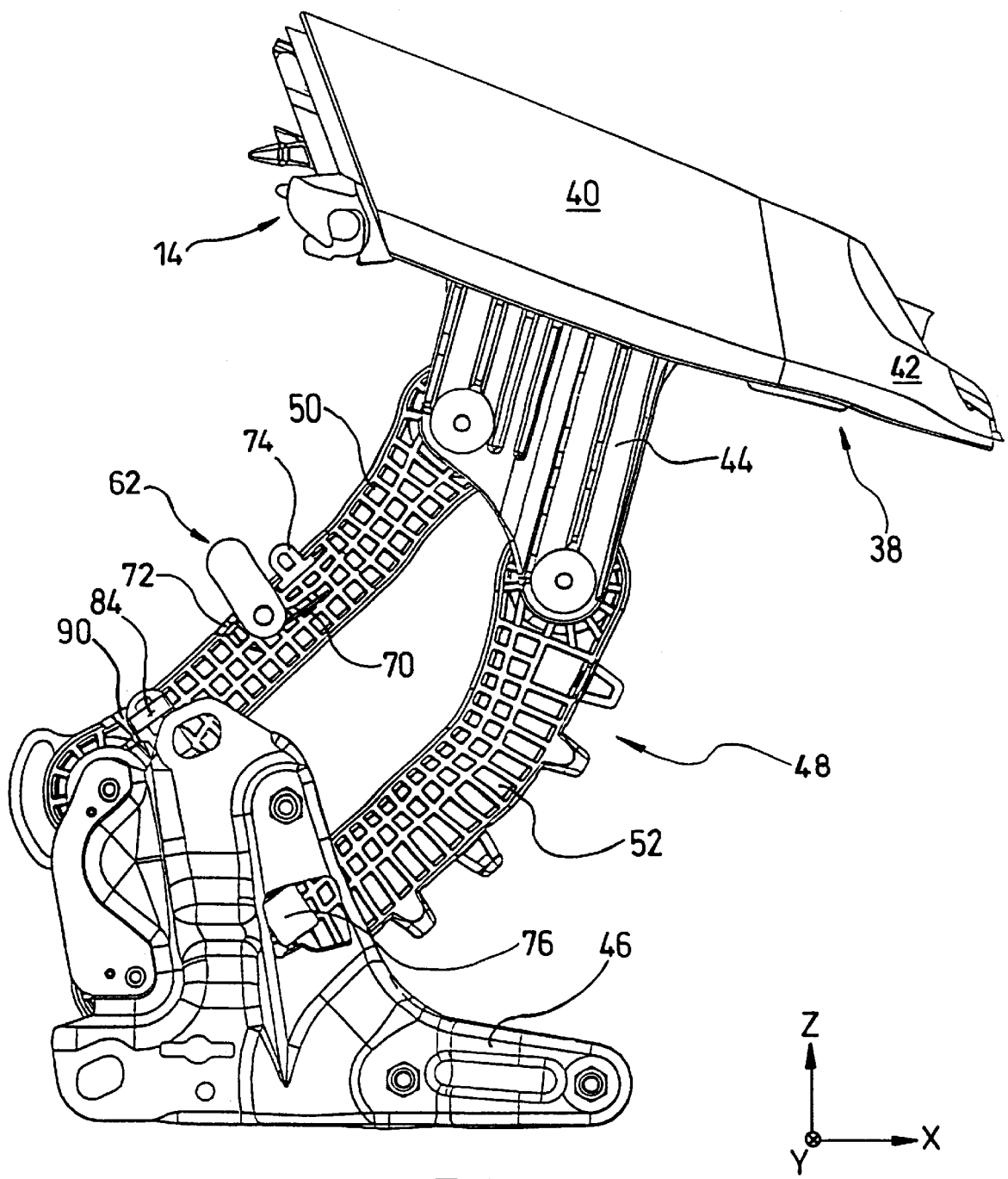
FIG. 5A is a side view similar to that of FIG. 4A, but showing the roof cassette in the intermediate position.
Figure 5B:
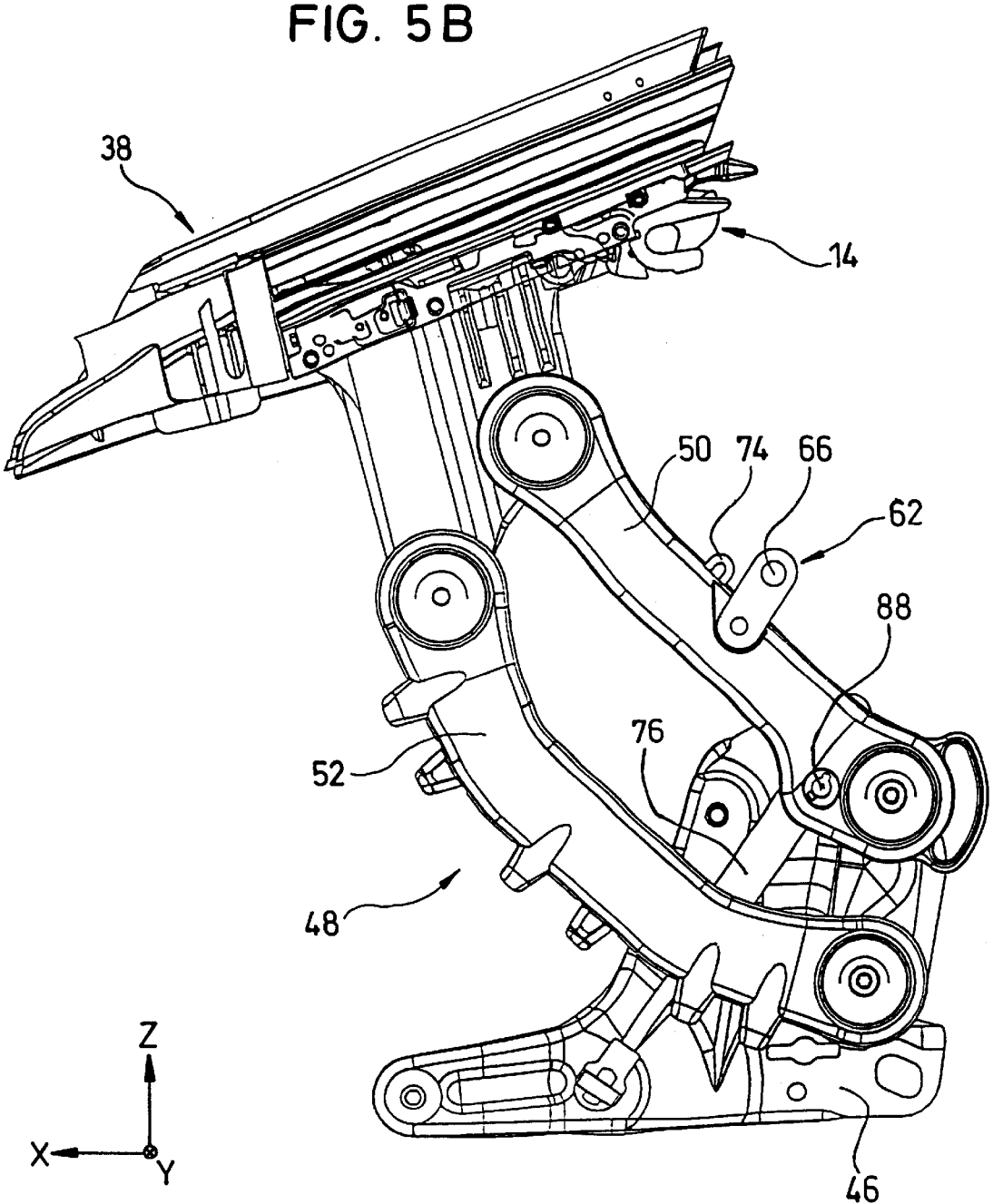
FIG. 5B is a side view similar to that of FIG. 4B, but with the roof cassette in the intermediate position.
Figure 6B:
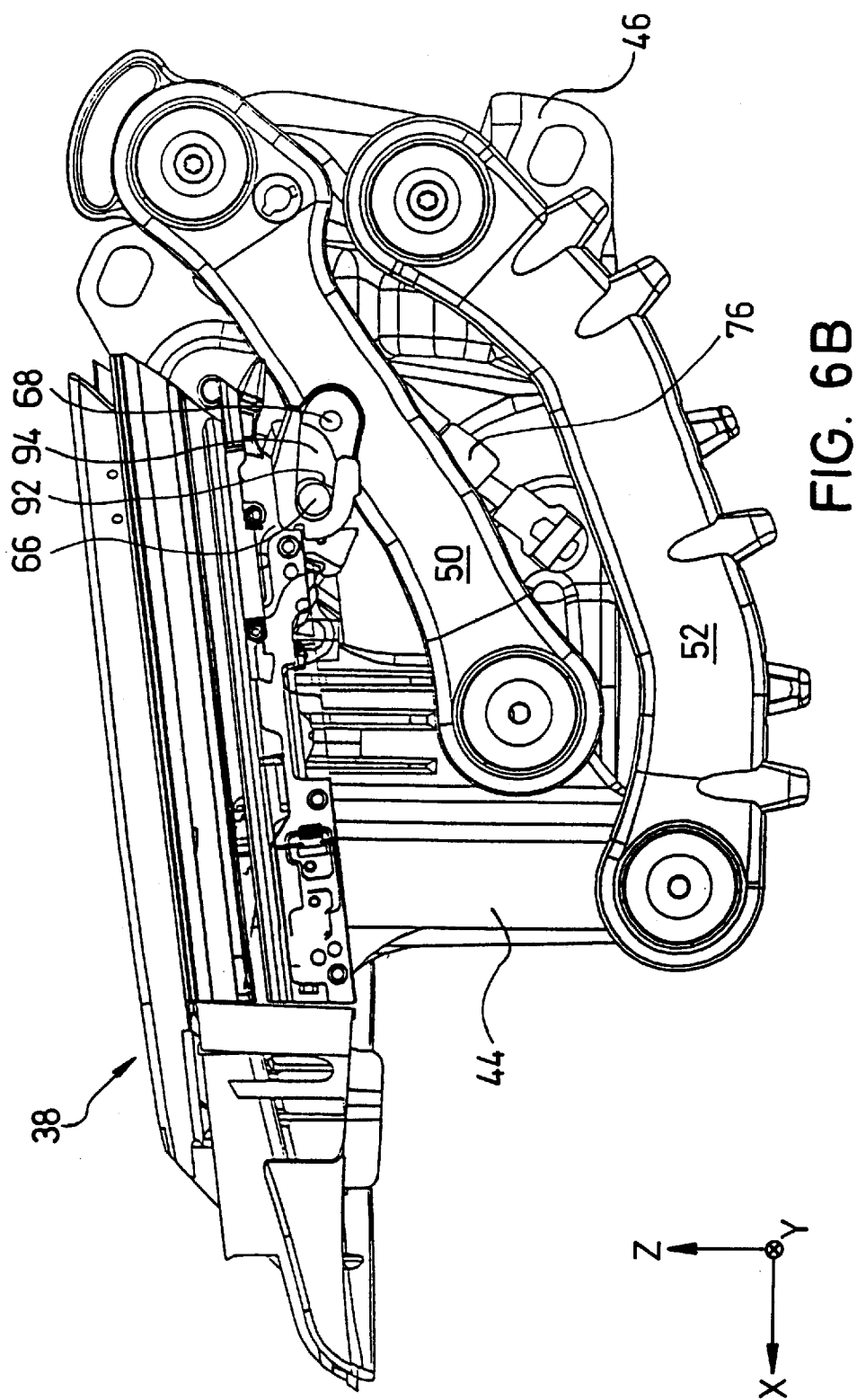
FIG. 6B is a side view similar to that of FIG. 4B, but with the roof cassette in the lowered position.

Via a pivot bearing 88 which is adjacent to the pivot bearing 58, the first end of a rocker 86 is coupled to the first connecting rod 50 of the four-bar arrangement 48 and the cylinder of a gas pressure spring 76 is connected to its second end via a coupling element 82. The piston rod of the gas pressure spring 76 is supported by a coupling element 78 on the main bearing 46 with a pivoting capacity, there being a pivot bearing 80 between the coupling element 78 and the main bearing 46. The axes of the pivot bearings 80, 84, and 88 which are assigned to the gas pressure spring 76 and the rocker 86 run essentially parallel to the axes of the pivot bearings 54, 56, 58, and 60 which are assigned to the connecting rods 50 and 52. The same also applies to the axis of the pivot bearing 68 around which the second thrust bearing 62 can be pivoted with reference to the first connecting rod 50. In the raised position of the roof cassette 12 as shown in FIGS. 4A and 4B, the gas pressure spring 76 is in the completely extended position and the rocker 86 projects with its end which carries the pivot bearing 84 beyond the outside contour of the first connecting rod 50 on the side of the first connecting rod 50 facing the second connecting rod 52. When the roof cassette 12 is lowered from the raised position into the intermediate position as shown in FIGS. 5A and 5B, the rocker 86 is pivoted essentially freely, i.e., essentially without the transfer of force to the first connecting rod 50, around the pivot axis 88 until the rocker 86 adjoins a stop 90 which is molded in one piece to the first connecting rod 50 and prevents further pivoting of the rocker 86 with reference to the first connecting rod 50. The intermediate position of the roof cassette 12 is reached when the rocker 86 adjoins the stop 90 with the gas pressure spring 76 essentially fully extended. In this position, the roof cassette 12 is stably held by the force exerted on the first connecting rod 50 by the gas pressure spring 76 and can be moved manually against the action of the force of the gas pressure spring into the lowered position which is shown in FIGS. 6A and 6B.

The closing device 14, which is explained in greater detail below, comprises a locking hook 94 which can be pivoted into and against the direction of the arrow 96, which can be moved into and against the direction of the arrow 98 (compare FIG. 4A), and which is moved preferably by means of motorized actuation by the drive motor 36, and a U-shaped receiving groove 92 which with the roof cassette 12 raised is opened essentially in the X direction. In order to fix the roof cassette 12 in the raised position with reference to the B-columns 20, proceeding from the intermediate position, the roof cassette 12 is moved manually into the raised position, the roof cassette 12 approaching the B-columns 20 according to the kinematics dictated by the four-bar arrangement 48, and a pin which is part of the first pivot support 11 is inserted into the receiving groove 92 of the closing device 14. To do this, the locking hook 94 which is located in FIGS. 4A, 4B, 5A and 5B in its front catch position in the locking position is pivoted upward in the direction of the arrow 96, traveling from the locking into a release position, in which the pin of the first pivot support 11 can travel into the receiving groove 92. When the pin is held, the locking hook 94 can be pivoted back into its locked position opposite the direction of arrow 96, and can be pushed opposite the direction of the arrow 98 from its front into its rear catch position, the pin of the first pivot support 11 traveling in the X-direction deeper into the receiving groove, and the sealing elements which are provided towards the vehicle interior to seal the roof cassette 12 are exposed to a predetermined contact pressure. The guide rail sections 22 and 26 are brought into alignment with the B-columns 20 in the coupling process of the roof cassette 12 by centering means which comprise a centering element 100, and thus, are aligned with reference to one another as is shown in detail in the commonly assigned patent application filed at the same time in the name of Burkhard Reinsch, entitled "MOTOR VEHICLE ROOF GUIDE RAIL," and claiming priority of German Patent Application No. 199 27 234.4-21, which application is incorporated herein by reference. As soon as the coupling process has been completed, locking of the parts of the folding roof 30 which are movably held in the rear guide rail section 22 are raised with respect to the rear guide rail section 22 and the folding roof 30 is pushed from its open position in the direction to its closed position, i.e., opposite the direction of the arrow 32 (see FIG. 1).

In order to decouple the roof cassette 12 from the first pivot support 11 which is provided on the two B-columns 20, first the folding roof 30 is moved into its open position in which all the parts of the folding roof 30 which are movably held in the rear guide rail sections 22 and 26 are located entirely in the rear guide rail section 22. The locking hook 94 is pushed in the direction of the arrow 98 from its rear catch position into its front catch position and is raised in the direction of the arrow 96 upwards into the release position so that the pin of the first pivot support 11 disengages from the receiving groove 92 of the closing device 14. The roof cassette 12 can now be moved into its intermediate position in which it is held by the gas pressure spring 76. The roof cassette 12 is transferred manually against the action of the gas pressure springs 76 in the direction of the arrow 102 (compare FIG. 2) from the intermediate position, as shown in FIGS. 5A and 5B, into the lowered position shown in FIGS. 6A and 6B. Shortly before reaching the lowered position, the second pivot support 62 interacts with the closing device 14 such that the pin 66 of the second pivot support 62 is inserted into the receiving groove 92 of the closing device 14. To do this, it can either be provided that the locking hook 94 is first held in its release position, and by interaction with the second thrust bearing 62, especially with the pin 66, disengages from its release position and travels into the locking position which locks the pin 66, or the locking hook 94 is located, first of all, elastically prestressed in its locking position and is raised by interaction with the pin 66 in the direction of the arrow 96, the locking hook 94 again returning into its locking position as soon as the pin 66 has been inserted far enough into the receiving groove 92 to be able to be locked by the locking hook 94 in its front catch position. The locking hook 94 can now draw the pin 66 opposite the direction of the arrow 98 more deeply into the receiving groove 92, the pivot arm 64 of the second pivot support 62 being pivoted against the action of the bending spring 70 around the axis of the pivot bearing 68 and the second pivot support 62 striking the rubber element 74. Thus, the roof cassette 12 is held stably in the lowered position and assumes a compact stowed position.

Specific embodiments of the closing device 14 will now be described with reference to FIGS. 7–12.

The closing device 14 of the embodiment shown in FIGS. 7–11 comprises a bearing plate 35 with a receiving element which is made as a receiving groove 193 and into which a pin 47 of the pivot support which is attached to the B-column 20 can be inserted in the displacement direction 98 (see, FIGS. 4a & 9) and can be locked by means of a locking groove 43 of a locking hook 94. Here, the locking groove 43 is placed in the front arm 39 of the locking hook 94 which is pivotally mounted via a bearing pin 57 in an angled bearing lever 159. The bearing pin 57 of the locking hook 96 is located roughly in the middle between the front arm 39 which encompasses the locking groove 43 and a rear arm 41, and the locking hook, 94 can be pivoted around the axis of the bearing pin 57 in the pivot direction 96 (see FIG. 7) between a locking position and a release position which are shown in FIGS. 7, & 9. Furthermore, in the locking position, the locking hook 94 can be shifted in the displacement direction 98 between a front catch position 53 which is shown in FIG. 9 in broken lines and a rear catch position 55.

The bearing lever 159 is made in two parts and comprises two congruent halves which are spaced apart in the Y direction by the thickness of a sleeve 63; their distance is such that the locking hook 94 and another control lever 185, which is described below, can be accommodated between them. The sleeve 63 is pushed onto an axle 61 which penetrates an arm 65 of the bearing lever 159 in the Y direction such that it projects above the halves of the bearing lever 159 on either side so that, on the one hand, it is held in the bearing plate 35, and on the other hand, is held in a bearing clip 59 which fits around the arm 65 and which, for its part, is fixed on the bearing plate 35. The bearing lever 159 can be pivoted around the axis 60 by means of a control pin 69 which is fixed on its second arm 67, the control pin 69 projecting beyond the bearing lever 159 in the –Y direction and fitting into a control path (cam groove) 73 of a control link 75 in which it is guided via a slide block 71.

The control link 75 is integrated in a link body 81 which has a second control link 79, in the control path 77 of which a control pin 83 which is fixed on the control lever 185 is movably accommodated and causes it pivot around the axis of the bearing pin 57, by means of which the control lever 185, jointly with the locking hook 94, is supported in the bearing lever 159, the control lever extending in the direction to the front arm 39 of the locking hook 94. A bent tab 92 of the control lever 185 fits into a recess 85 of the locking hook 94, which recess is open in the –Z direction, and is used to drive the locking hook 94, when the control lever 185 is pivoted clockwise, from the control path 78 via its control pin 83 (the terms clockwise and counterclockwise used here relate to viewing in the Y direction).

A retaining lever 89 is pivotally mounted on the locking hook 94 by an extension pin 91 roughly in the middle in the area between the recess 85 and the locking groove 43, a tension spring 191 being provided between a projection 88 which is located on the first arm 93 of the retaining lever 89 and a bent tab 187 of the control lever 185. By means of the tension spring 191, a pretension is impressed clockwise on the control lever 185 such that the bent tab 92 of the control lever 185 fits without play in the recess 85 of the locking hook 94, at the same time, the retaining lever 89 likewise being pivoted clockwise and prestressed against a holding pin 87 which is fixed on the bearing plate 35 and which extends in the –Y direction by means of a sloped surface 95 which is provided on its first arm 93, if the locking hook 94 is located outside of its release position. The sloped surface 95 which is located in the first arm 93 of the holding lever 89 above a catch area 199 which is opened essentially in the X direction is made such that, via the pre-tensioned contact of the sloped surface 95 with the holding pin 87, a force is exerted on the locking hook 94, the latter turns counterclockwise around the axis of the bearing pin 57, and the locking hook 94 rests on a bent tab 188 of the bearing plate 35 via a slide surface 190 which runs in the displacement direction 98 and which lies, when viewed in the lengthwise direction of the vehicle 10, behind the locking groove 43 (i.e., is arranged offset from the locking groove 43 in the positive X direction). Furthermore, the holding pin 87 is used as a capture device into which the catch area 199 of the retaining lever 89 fits when the locking hook 94 is in its release position.

A second arm 195 of the retaining lever 89, which is located underneath the extension pin 91 (i.e., is offset with reference to it in the negative Z direction), has a projection 97 which protrudes upward essentially in the X direction and which, in order to fix the control lever 185 with reference to the locking hook, 94, can be placed against the bottom of the bent tab 92 of the control lever 185 as soon as the locking hook 94 approaches its rear catch position 55.

An alignment plate which extends essentially in the X direction and which is labeled 100 throughout is connected to the bearing plate 35 via several screws 99 which, at the same time, penetrate the lower area of the guide rail section 22, which in addition is fixed, via blind rivets which are not shown, in its top area directly on the bearing plate 35, strong cohesion of the bearing plate 35, the guide rail section 22 and the alignment plate 100 is achieved. The guide rail section 22 has a bottom and a top slide way 101 and 103 which are separated from one another by a partition 104 which runs in the X-Z plane. The lower slide way 101 is bounded laterally by the partition 104 and the rear wall of the bearing plate 35 and to the top and bottom by legs which extend from the partition 104 in the Y direction, and is open in the +/−X direction. It is used for accommodation of the link body 81 which, for its part, has a stopping edge 108 which projects upward in the Y direction and which extends through an opening 106 in the partition 104 into the area of the slide way 103; this accommodation can be moved in the +/−X direction. Here, the link body 81 can be moved in the +/−X direction between a rear end position and a front end position.

The slide way 103 is bounded to the top and bottom by legs 112 and 110 which extend in the Y direction and by means of fixed links 109, which are located vertically on the legs 110 and 112, is divided into two open chambers 111, 113, of which the inner chamber 110 is used to accommodate a driving slider 114 and the outer chamber 113 is used to accommodate the slider 116 of the roof edge 34. Both sliders 114 and 116 can be moved in the +/−X direction. On the driving slider 114, a compressively stiff cable 174 is attached which can be moved via a motor which is fixed on the roof cassette 12 and is guided in a cable channel 118 which is held laterally next to the slide way 103 in the partition 104.

Between the top 119 of the alignment plate 100 and the bottom of the leg 110, a probe slider 120 which can be moved in the +/−X direction is held as part of a pivot support detection means which is pre-tensioned by the action of a tension spring 122 which is attached between the probe slider 120 and the alignment plate 100 in the −X direction, such that its probe tip 124 projects over the front edge 125 of the guide rail section 22. On the end of the probe slider 120 which is opposite the probe tip 124 viewed in the X direction, there is a releasing device 126 which interacts with a release arm 128 of an angled catch lever 130 which, for its part, is mounted to pivot around an axis 131 between the bearing plate 35 and the alignment plate 100. On the arm 132 of the catch lever 130 extending essentially perpendicular to the release arm 128 there is a catch projection 133 which is designed to fit into a stopping edge which is formed in a complementary manner, but which is not shown, on the bottom of the link body 81 when the link body 81 stops in a warning position which is located behind its front end position. Here, the warning position of the link body 81 is located with reference to the bearing plate 35 at a point which is located between the front position and the rear end position of the link body 81, the front end position corresponding to a smaller X-coordinate than the rear end position.

The catch lever 130 is loaded counterclockwise by means of a spring arm 134 of a combination spring 138 which has two spring arms 134 and 136 so that the catch projection 133, with the link body 81 in the warning position, is pre-tensioned against its stopping edge and prevents the link body 81 from reaching its forward end position, if the pivot support is not located in its specified position with reference to the closing device 14. The link body can be moved in this case only between its rear end position and its warning position. Conversely, if in the process of coupling the closing device 14 to the pivot support, the specified position of the pivot support is reached relative to the closing device 14, the probe tip 124 of the probe slider 120 makes contact with the pivot support, the probe slider 120 is pushed in the X direction against the force of the tension spring 122 so far that the releasing device 126 actuates the release arm 128 of the catch lever 130 and pivots the latter around the axis 131 clockwise against the action of the spring arm 134, and the catch projection 133 of the catch lever 130 disengages with reference to the stopping edge on the bottom of the link body 81. The link body 81 can now be pushed further forward (therefore in the −X direction) in the direction to its front end position. The second spring arm 136 of the combination spring 138 is pre-tensioned upward in the Z direction and can be deflected downward against its pre-tensioning by the rear arm 41 of the locking hook 94 when the locking hook 94 is in its release position. In doing so, the spring arm 136, in its upwardly pre-tensioned base position, actuates an electric microswitch 140 which is fixed with the combination spring 138 on the bearing plate 35, the microswitch 140 delivering a corresponding signal "locking hook in the locking position." This signal is supplied as the input quantity to the electrical control which controls the motorized actuation of the closing device 14 and which likewise assumes control of the motorized actuation of the opening and closing motion of the folding roof 30.

Furthermore, it can be provided for the spring arm 136, instead of its upward elastic pre-tensioning, to be connected by form-fit to the rear arm 41 of the locking hook 94 so that the latter actuates the spring arm 136 in both directions, i.e., up and down.

As an alternative to the interaction of the probe tip 124 of the probe slider 120 with the pivot support, there can also be an interaction of the probe tip 124 with the side member 28, when the side member 28 is in the specified position and it is locked especially to the vehicle. In this case, the probe slider 120, in the coupling process of the closing device 14 to the pivot support, is actuated by the side member 28 and is pushed in the X direction so far that the catch projection 133 of the catch lever 130 no longer locks the link body 81 in its warning position. If the side member 28, on the other hand, is removed from the vehicle or it is not located for some other reason in its specified position with reference to the closing means 14 in the coupling position, the probe tip 124 is not actuated in the coupling process, or is not actuated far enough in the X-direction, and the link body 81 is locked when it reaches its warning position, even if the pivot support is in the specified position. Thus, the pivot support detection means is, in principle, used for side member detection. This has the further advantage that, when the closing device 14 is coupled to the other pivot support which is attached to the quad joint, the link body 81 cannot be pushed any further than into its warning position, since the pivot support which is provided on the quad joint is in the specified position, but there is no side member. This prevents the locking of the roof edge slider 116, which is described further below, from being released with reference to the closing means 14, when the closing device 14 is coupled to the pivot support of the quad joint.

An alignment fork 152 on the front end of the alignment plate 100 is used to align the closing device 14 in the Y and Z direction with reference to the front guide rail section 26, for which purpose, the alignment fork 152 fits into an alignment bearing which is shaped in a complementary manner and which forms a unit with the front guide rail section 26 which is supported floating on the side member 28. The alignment strip 24, which is fixed on the guide rail section 22 of the closing device 14 and which is located in the Z direction above the alignment fork 152 and can be caused to engage the front guide rail section 26, prevents inclination of the front guide rail section 26 around the X-axis with reference to the guide rail section 22. The alignment surface 150 is placed on one side surface of the alignment fork 152 in the X-Z plane and can be placed against the end face of the pin 47 of the pivot support which is attached to the B-column 20, so that in interaction with the mirror-image left closing device and the left pin, the alignment of the entire roof cassette 12 takes place with reference to the two pins 46 which are attached to the body, this alignment being symmetrical when viewed in the Y direction.

On the bent tab of the alignment plate 100, which runs in the Y direction, an end position spring 146 is fixed which comprises two spring arms 142 and 144, of which the spring arm 142 fits from underneath into the chamber 113 in which the roof edge slider 116 is held, which is connected to the roof edge 34 of the folding roof 30 and which causes the opening and closing motion of it. The second spring arm 144 is designed to mechanically actuate an electric microswitch 148 when the roof edge slider 116 is in the holding position, the microswitch 148 delivering the signal "roof edge slider in the holding position" to the electronic control device. In this position, the roof edge slider 116 is held completely in the guide rail section 22 of the closing device 14 and can be locked with reference to the guide rail section 22. With the roof edge slider 116, all movable parts of the folding roof 30 are held in the guide rail section 22 and can be decoupled together with the roof cassette 12 from the pivot support mounted on the body.

With the folding roof 30 closed, the roof edge slider 116 and the driving slider 114 are located in the front guide rail section 26 and are joined to one another by form-fit by means of a bolt block 164 which is movably held in the Z direction in the roof edge slider 116. The roof cassette 12 is fixed via the closing devices 14 on the B-columns 20 of the motor vehicle 10, the locking hook 94 stopping in the locking position in its rear catch position 55.

The link body 81 is in its front end position and in the latter is held in a recess 162 of the bearing plate 35 by a bolt block 156 which is movably supported in the Y direction and which can catch in its end positions by means of a ball 158 which is loaded via a compression spring 160. While the control pin 69, which controls the pivoting motion of the bearing lever 159, and thus, the displacement motion of the locking hook 94 with the sliding block 71, is on the back end of a holding area 204 of the control path 73 of the control link 75, the control pin 83 of the control lever 185 is in the holding area 206 of the control path 77 of the control link 79 which is responsible for the pivoting motion of the locking hook 94. The retaining lever 89 is pivoted counterclockwise by its sloped surface 94 adjoining the holding pin 87 such that its projection 97 fits under the bent tab 92 of the control lever 185 and fixes it with reference to the locking hook 94. Since the position of the control lever 185 is strictly dictated by its receiver, both in the bearing lever 159 (by the bearing pin 57) and also in the holding area 206 of the control link 79 (by the control pin 83), the locking hook 94 is ultimately blocked in its locking position. So that the link body 81 can be located in its front end position, of course as described above, the pivot support and the side member 28 must be in the specified position, the probe slider 120 must be actuated and the catch projection 133 of the catch lever 130 must be disengaged with reference to the stopping edge which is located on the bottom of the link body 81.

Figure 11:
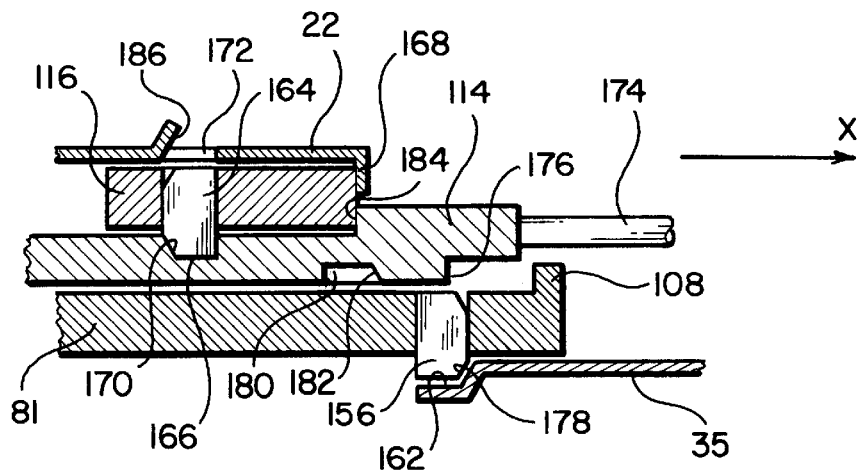
FIG. 11 is a schematic partial section along the line 11—11 in FIG. 7. illustrating the bolt block couplings of a driving slider which can be moved by a motor to a link body which controls the motion of the locking hook of the closing device and to a roof edge slider of the folding roof.

In order to decouple the roof cassette 12 from the B-column 20, first the folding roof 30 must be opened by the roof edge slider 116 being pushed to the rear in the opening direction 32. The displacement motion is impressed on the roof edge slider 116 by the driving slider 114 which is moved by the conventional compressively stiff cable 174 via the electric motor 222 which is held in the roof cassette 12. Both the roof edge slider 116 and also the driving slider 114 finally travel from the front guide rail section 26 into the guide rail section 22 of the closing device 14, the roof edge slider 116, as soon as it has reached its holding position, striking a stop 168 which is provided in the guide rail section 22 and preventing further displacement of the roof edge slider 116 to the rear (in the X direction; see FIG. 11), also, as described above, the electric microswitch 148 being actuated by the spring arm 144. The driving slider 114 has now reached its transfer position which is shown in FIG. 11. If the driving slider 114 is furthermore exposed to a force in the X direction by the electric motor 222 via the compressively stiff cable 174, the sloping surface 170 in a recess 166 which holds the bolt block 164 in the driving slider 114 exerts a force on the bolt block 164 in the Z direction, which force is enough to displace the bolt block 164 in the Z direction so far that the bolt block 164 disengages from the recess 166 in the driving slider 114 and is pushed with its end facing away from the driving slider 114 into a recess 172 in the guide rail section 22. Thus the roof edge slider 116 is held by form fit in the guide rail section and the driving slider 114 is released for further displacement in the X direction, the side of the driving slider 114 facing the roof edge slider 116 being made such that release of the form-fit connection between the roof edge slider 116 and the guide rail section 22 by displacement of the bolt block 164 in the roof edge slider 116 in the −Z direction is precluded. After traversing a predetermined path, the coupling surface 176 of the driving slider 114 strikes the stopping edge 108 of the link body 81 which is located in the front end position as shown in FIG. 11. At the same time, a recess 180 in the side of the driving slider 114 facing the link body 81 which is shaped in a complementary manner to the bolt block 156 comes to rest over the bolt block 156. As a result, when force continues to be exerted on the driving slider 114 in the X direction, the latter entrains the link body 81 via the coupling surface 176 abutting the stopping edge 108, so that the sloped surface 178 in the recess 162 which holds the bolt block 156 in the bearing plate 35 exerts a force on the bolt block 156 in the Y direction which shifts the bolt block 156 in the link body 81 into its second end position in which the bolt block 156 disengages from the recess 162 and engages within the recess 180. The bolt block 156 releases the form-fit connection of the link body 81 to the bearing plate 35, and at the same time, forms a connection between the link body 81 and the driving slider 114 which entrains the link body 81 in the direction to its rear end position. Here, the displacement of the bolt block 156 in the −Y direction, out of the recess 180, is precluded not only as a result of the spring-loaded ball 158 which keeps the bolt block 156 in its end position, but also by the fact that the side of the bearing plate 35 facing the driving slider 114 behind the sloped surface 178 is moved accordingly near the link body 81.

It should be pointed out that the driving slider 114 entrains the link body 81 in its back end position in the X direction via the coupling surface 176 which abuts the contact surface 108. The link body 81 is entrained in the direction toward its front end position (in the X direction) by means of the form-fit connection between the driving slider 114 and the link body 81, which connection is caused via the bolt block 156.

Alternatively to the above described locking of the bolt block 156 in its two end positions, the bolt block 156 can also be locked only in its end position which is shown in FIG. 11 by means of the spring-loaded ball 158, the ball 158 and its spring 160 being shown in FIG. 8.

When the link body 81 is displaced in the X direction towards its back end position, the sliding block 71 which is held on the control pin 69 of the bearing lever 159 travels first from the holding area 204 into a displacement area 208 of the control path 73, an area which runs to the rear in the manner of a ramp. Here, a clockwise pivoting motion is forced on the bearing lever 159 around its axis 60 and this motion is converted via the bearing pin 57 into a displacement motion of the locking hook 94, the locking hook 94 being pushed from its rear catch position 55 in the displacement direction 98 forward in the X-axis direction towards its front catch position 53 and sliding over its sliding surface 190 on the bent tab 188 of the bearing plate 35. The front catch position 53 is reached when the sliding block 71 is at the lowest point of the ramp-shaped displacement area 208 of the control path and passes into a front holding area 212 in which it is essentially horizontally guided so that the bearing lever 159 no longer pivots.

Approximately when the front catch position 53 is reached, further displacement of the link body 81 in the X direction initiates pivoting of the locking hook 94 from its locking position into its release position by the control pin 83 of the control lever 185 leaving the holding area 206 of the control path 77 and meeting the area of an upwardly directed pivot cam 210, which cam forms a recumbent Y with the front area of the control path 77. The control pin 83 follows the upper leg of the recumbent Y, and via the bent tab 92, impresses a pivoting motion on the locking hook 94 around the axis of the bearing pin 57 which also pivotally connects the control lever 185 with the bearing lever 159. As soon as the locking hook 94 has been raised into the release position, the catch area 199 of the retaining lever 89 locks into the holding pin 87 and keeps the locking hook 94 in its release position. In doing so, the actuation of the microswitch 140 is canceled via the spring arm 136, and the pin 47 of the thrust bearing disengages from the locking groove 43 of the locking hook 94, so that the roof cassette 12 is decoupled from the B-column 20, and, as already described in conjunction with FIGS. 1 & 2, can be lowered.

The coupling process of the roof cassette 12 by means of the closing device 14 to the pivot support which is located on the body proceeds analogously in the reverse sequence, reference being made to the following particulars. If the link body 81 is in its rear end position, the control pin 83 is in front of the forward edge of the cam 210. If the closing device 14 is pressed manually against the pivot support, first of all, the pin 47, from forward, strikes the second arm 195 of the retaining lever 89, i.e., the arm projecting into the receiving groove 193, by which a counterclockwise pivoting motion is impressed on the lever. When the pin 47 makes contact with the rear wall of the locking groove 43, it exerts on the locking hook 94 a force with a line of action which runs underneath the bearing pin 57 so that a counterclockwise torque is impressed on the locking hook 94 in addition to the force exerted by the tension spring 191. In this way, the catch area 199 of the retaining lever 89 disengages from the holding pin 87, and the locking hook 94 can pivot into its locking position without the control pin 83 hindering this motion since it is outside the control path 77. As soon as the sloped surface 95 of the retaining lever 89 abuts the holding pin, the locking hook 94, as already described, is pretensioned by the tension spring 191 in the direction toward the locking position. When the link body 81 continues to moved forward (in the X direction) the control pin 83 of the control lever 185 is deflected down by the cam 210 and is inserted into the lower arm of the recumbent Y. This motion is not transferred to the locking hook 94, since the bent tab 92 of the control lever 185 has not yet reached underneath the projection 97 of the retaining lever 89, but rather can drift down from the recess 85 of the locking hook 94. Only when the locking hook 94 is pushed further in the direction toward its rear catch position 55 is the retaining lever 89 pivoted counterclockwise to such an extent that the control lever 185 is fixed with reference to the locking hook 94 by fitting underneath the lower edge of the bent tab 92 by means of the projection 97 of the retaining lever 89. If the pivot support and/or the side member 28 should be out of its specified position, the probe tip 124 of the probe slider 120 is not actuated or is not actuated far enough in the X direction and the link body 81 is stopped in the warning position, before reaching the front end position, by the stopping edge located on the bottom striking the catch projection 133 of the catch lever 130. In doing so, the electric motor 222 which actuates the compressively stiff cable 174 is blocked and turned off. Conversely, if the pivot support is in the specified position, the link body 81 can be pushed into its front end position, in which, when the driving slider 114 continues to be exposed to the force in the –X direction, the bolt block 156 is pushed by the sloped surface 182 in the recess 180 of the driving slider 114 in the –Y direction into the recess 162 in the bearing plate 35, and at the same time, the driving slider 114 disengages from the link body 81. The bolt block 156 is held in this position by the ball 158, while the driving slider 114 is pushed further forward into the transfer position where it comes to rest against the roof edge slider 116 by means of a coupling surface 184. In doing so, via the compressively stiff cable 174, a force is exerted forward on the roof edge slider 116, a force which is enough to push the bolt block 164 of the roof edge slider 116 in the –Z direction out of the recess 172 and into the recess 166 of the driving slider 114 via a sloped surface 186 on the front of the recess 172 in the guide rail section 22. In this way, the coupling between the roof edge slider 116 and the guide rail section 22 is canceled and coupling between the roof edge slider 116 and the driving slider 114 is established.

Figure 12:
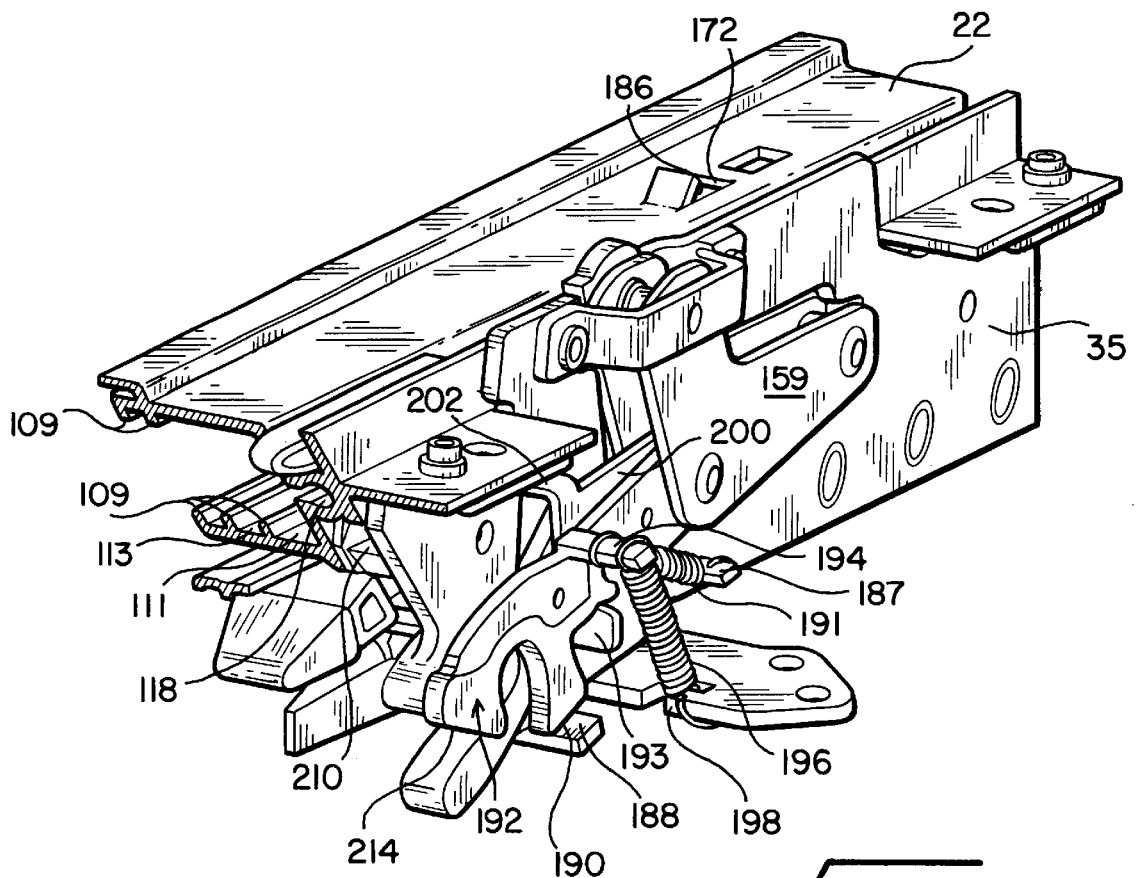
FIG. 12 is a perspective view of a modified embodiment of the closing device, the locking hook thereof being in its rear catch position in the locking position.

FIG. 12 shows an alternative embodiment of a closing device which differs from the one shown in FIGS. 3 to 7 essentially only in that a retaining lever corresponding to the retaining lever 89 of the first embodiment is eliminated, and the locking hook 192 does not have a rear arm corresponding to the rear arm 41 of the locking hook 94. The elastic pre-tensioning of the locking hook 192 in the direction to its locking position is applied by a tension spring 196 which extends between the bent tab 194 on the locking hook 192 and the holding projection 198 on the bearing plate 35. A modified control lever 200, instead of the control pin 83 of the control lever 185, has a control tab 202 which is molded on the control lever 200 in one piece and which interacts with the control path 77 in order to control the pivoting motion of the locking hook 192. The bent tab 193 of the control lever 200, as is likewise the case for the control lever 185 of the first embodiment of the closing device, is pre-tensioned clockwise from underneath against the locking hook 192, but the pre-tensioning force in the second embodiment of FIG. 12 is delivered by the tension spring 191 which, in contrast to the first embodiment, extends between the bent tab 187 on the control lever 200 and the bent tab 194 on the locking hook 192.

When the link body 81 approaches its back end position, the control tab 202, like the control pin 83 of the first embodiment, travels to in front of the forward edge of the swivel cam 210. Since the locking hook 192 is not held in its release position by a retaining lever, it now swivels freely into the locking position. When the closing device as shown in FIG. 12 is coupled to the pivot support which is mounted on the vehicle body, therefore the locking hook 192 which in the locking position is in its front catch position must first be raised by the pin 47 into the release position, for which the locking hook 192 on its front side has a sloped surface 214. There is as little blocking of the locking hook 192 in the locking position, in contrast to the first embodiment of the closing device, as the microswitch 140 for interrogating the swivel position of the locking hook 192.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle roof with a lowerable roof part, a lowering mechanism for moving the lowerable roof part from a raised position into a lowered position and which comprises a closing device for locking the lowerable roof part in both the raised position and in the lowered position, a first pivot support which is fixed on a stationary roof part, and a second pivot support which is fixed on an element of the lowering mechanism; wherein the closing device interacts with the first pivot support when the lowerable roof part is in the raised position; and wherein the closing device interacts with the second pivot support when the lowerable roof part is in the lowered position.

2. Motor vehicle roof as claimed in claim 1, further comprising an auxiliary force actuation device for actuating the closing device.

3. Motor vehicle roof as claimed in claim 1, further comprising at least one openable roof part which can be opened while a vehicle equipped with the vehicle roof is in motion, and which, at least in an open position thereof, is supported by the lowerable roof part.

4. Motor vehicle roof as claimed in claim 3, further comprising an auxiliary force actuation device for actuating the closing device; wherein the auxiliary force actuation device actuates both the closing device and the openable roof part.

5. Motor vehicle roof as claimed in claim 1, wherein the lowering mechanism comprises a four-bar arrangement.

6. Motor vehicle roof as claimed in claim 5, wherein the four-bar arrangement comprises a first and a second connecting rod which are each pivotally connected to the lowerable roof part and a main bearing which is fixed on a motor vehicle body.

7. Motor vehicle roof as claimed in claim 6, wherein the second pivot support is fixed on the first connecting rod of the four-bar arrangement.

8. Motor vehicle roof as claimed in claim 7, wherein the second pivot support is movably connected to the first connecting rod of the four-bar arrangement.

9. Motor vehicle roof as claimed in claim 8, wherein the second pivot support is pivotally connected to the first connecting rod of the four-bar arrangement, a pivot axis of the second pivot support running essentially parallel to a pivot axis around which the first connecting rod of the four-bar arrangement is pivotable with reference to the lowerable roof part and the main bearing.

10. Motor vehicle roof as claimed in claim 8, wherein the second pivot support is movable into a rest position by means of a prestressed spring arrangement which is supported on the first connecting rod of the four-bar arrangement, the second pivot support assuming the rest position at least when released by the closing device.

11. Motor vehicle roof as claimed in claim 10, wherein the second pivot support is movable from its rest position into a deflected position opposite action of the prestressed spring arrangement when held by closing device.

12. Motor vehicle roof as claimed in claim 11, wherein movement of the second pivot support is limited by a rubber-elastic stop which is provided between the second pivot support and the first connecting rod of the four-bar arrangement.

13. Motor vehicle roof as claimed in claim 6, wherein a spring arrangement which is supported on the motor vehicle body is couplable to at least one of the first and second connecting rods of the four-bar arrangement, and the spring arrangement applying a spring force to the lowerable roof part in a direction toward the raised position and compensates at least for part of a weight component of the lowerable roof part which acts in the lowering direction.

14. Motor vehicle roof as claimed in claim 13, wherein the spring arrangement acts on the lowerable roof part essentially only between the lowered position and an intermediate position which precedes reaching of the raised position.

15. Motor vehicle roof as claimed in claim 14, wherein the spring arrangement is coupled to a rocker which is pivotally connected to one of the first and second connecting rods of the four-bar arrangement and which decouples motion of the lowerable roof part from actuation of the spring arrangement between the raised position and the intermediate position of the lowerable roof part, pivoting of the rocker with reference to said one of the first and second connecting rods being blocked starting with reaching of the intermediate position.

16. Motor vehicle roof as claimed in claim 13, wherein the spring arrangement is supported relative to the motor vehicle body on the main bearing.

* * * * *